(12) United States Patent
Childers et al.

(10) Patent No.: US 11,453,754 B2
(45) Date of Patent: Sep. 27, 2022

(54) WATER-SOLUBLE POLYVINYL ALCOHOL BLEND FILM, RELATED METHODS, AND RELATED ARTICLES

(71) Applicant: MONOSOL, LLC, Merrillville, IN (US)

(72) Inventors: Jennifer L. Childers, Lowell, IN (US); Richard Goetz, Merrillville, IN (US); Percy Bromby, II, Merrillville, IN (US); Akio Nishimi, Merrillville, IN (US); Mitsunori Asada, Merrillville, IN (US); David M. Lee, Crown Point, IN (US)

(73) Assignee: MONOSOL, LLC, Merrillville, IN (US)

( * ) Notice: Subject to any disclaimer, the term of this patent is extended or adjusted under 35 U.S.C. 154(b) by 0 days.

(21) Appl. No.: 16/383,057

(22) Filed: Apr. 12, 2019

(65) Prior Publication Data

US 2019/0338090 A1 Nov. 7, 2019

Related U.S. Application Data

(60) Provisional application No. 62/666,082, filed on May 2, 2018.

(51) Int. Cl.
| | | |
|---|---|---|
| C08J 5/18 | (2006.01) | |
| C08L 29/04 | (2006.01) | |
| C11D 17/04 | (2006.01) | |

(52) U.S. Cl.
CPC ................ *C08J 5/18* (2013.01); *C08L 29/04* (2013.01); *C11D 17/043* (2013.01); C08J 2329/04 (2013.01); C08J 2429/04 (2013.01); C08L 2203/16 (2013.01); C08L 2205/025 (2013.01); C08L 2205/03 (2013.01)

(58) Field of Classification Search
CPC ................ C08L 2205/025; C08L 29/04; C08J 2329/04; C08J 2429/04
See application file for complete search history.

(56) References Cited

U.S. PATENT DOCUMENTS

| | | |
|---|---|---|
| 2,220,099 A | 11/1940 | Guenther et al. |
| 2,477,383 A | 7/1949 | Lewis |
| 3,580,390 A | 5/1971 | Shull, Jr. |
| 3,664,961 A | 5/1972 | Norris |
| 3,919,678 A | 11/1975 | Penfold |
| 3,929,678 A | 12/1975 | Laughlin et al. |
| 3,975,280 A | 8/1976 | Hachmann et al. |
| RE29,059 E | 12/1976 | Kack et al. |
| 4,000,093 A | 12/1976 | Nicol et al. |
| 4,075,116 A | 2/1978 | Mesaros |
| 4,222,905 A | 9/1980 | Cockrell, Jr. |
| 4,239,659 A | 12/1980 | Murphy |
| 4,246,612 A | 1/1981 | Berry et al. |
| 4,259,217 A | 3/1981 | Murphy |
| 4,466,431 A | 8/1984 | Tharrat et al. |
| 4,681,228 A | 7/1987 | Kerry et al. |
| 4,810,410 A | 3/1989 | Diakun et al. |
| 5,114,611 A | 5/1992 | Van Kralingen et al. |
| 5,137,646 A | 8/1992 | Schmidt et al. |
| 5,227,084 A | 7/1993 | Martens et al. |
| 5,340,496 A | 8/1994 | Sato et al. |
| 5,558,228 A | 9/1996 | Jackisch et al. |
| 5,576,281 A | 11/1996 | Bunch et al. |
| 6,204,223 B1 | 3/2001 | Holmes et al. |
| 6,599,871 B2 | 7/2003 | Smith |
| 7,476,325 B2 | 1/2009 | Tufano et al. |
| 8,163,104 B2 | 4/2012 | Swidersky et al. |
| 8,333,033 B2 | 12/2012 | Bell |
| 8,728,593 B2 | 5/2014 | Vicari et al. |
| 8,835,372 B2 | 9/2014 | Jennewein |
| 2003/0060390 A1 | 3/2003 | Demeyere et al. |
| 2003/0126282 A1 | 7/2003 | Sarkar et al. |
| 2003/0139312 A1 | 7/2003 | Caswell et al. |
| 2004/0144682 A1 | 7/2004 | Altmayer |
| 2004/0204337 A1 | 10/2004 | Corona et al. |
| 2006/0172910 A1 | 8/2006 | Brooker et al. |
| 2006/0173430 A1 | 8/2006 | Lee et al. |
| 2007/0003719 A1 | 1/2007 | Balchin |
| 2007/0219111 A1 | 9/2007 | Ward et al. |

(Continued)

FOREIGN PATENT DOCUMENTS

| | | |
|---|---|---|
| EP | 0197434 A2 | 10/1986 |
| EP | 0414549 A2 | 2/1991 |
| EP | 0989803 A1 | 4/2000 |
| GB | 1137741 A | 12/1968 |
| GB | 1466799 A | 3/1977 |
| RU | 2575930 C2 | 2/2016 |
| WO | WO-94/007974 A1 | 4/1994 |
| WO | WO-94/007986 A1 | 4/1994 |
| WO | WO-94/22800 A1 | 10/1994 |

OTHER PUBLICATIONS

International Application No. PCT/US2019/027310, International Search Report and Written Opinion, dated Jul. 22, 2019.
Griffin, Calculation of HLB Values of Non-Ionic Surfactants, Journal of the Society of Cosmetic Chemists, 5:249-56 (1954).

*Primary Examiner* — Wenwen Cai
(74) *Attorney, Agent, or Firm* — Marshall, Gerstein & Borun LLP

(57) ABSTRACT

Disclosed herein are water-soluble films including a polyvinyl alcohol (PVOH) resin blend and optionally one or more additional components such as plasticizers, fillers, surfactants, and other additives. The PVOH resin blend includes a first copolymer including a first anionic monomer unit and a second PVOH copolymer including a second anionic monomer unit. When the PVOH copolymers are blended in particular proportions and/or selected with regard to various criteria related to physical and chemical film properties, the resulting water-soluble film formed from the PVOH resin blend exhibits maintained film stiffness, and pouch tautness when in contact with liquid pouch contents, maintain acceptable clarity properties, and/or demonstrate acceptable band release without impairing the ultimate solubility of the water-soluble film.

25 Claims, 2 Drawing Sheets

(56) References Cited

U.S. PATENT DOCUMENTS

| | | |
|---|---|---|
| 2008/0185347 A1 | 8/2008 | Tufano et al. |
| 2009/0312220 A1 | 12/2009 | Boutoille et al. |
| 2010/0305020 A1 | 12/2010 | Jennewein |
| 2011/0023240 A1 | 2/2011 | Fossum et al. |
| 2011/0054111 A1 | 3/2011 | McLachlan et al. |
| 2011/0186467 A1 | 8/2011 | Denome et al. |
| 2014/0110301 A1 | 4/2014 | Carrier et al. |
| 2014/0124454 A1 | 5/2014 | Nichols et al. |
| 2014/0162929 A1 | 6/2014 | Labeque et al. |
| 2014/0345064 A1 | 11/2014 | Koch et al. |
| 2015/0329807 A1 | 11/2015 | Naqvi et al. |
| 2016/0102278 A1 | 4/2016 | Labeque et al. |
| 2016/0280869 A1 | 9/2016 | Nii et al. |
| 2017/0218146 A1 | 8/2017 | Childers et al. |
| 2017/0226338 A1 | 8/2017 | Friedrich et al. |
| 2017/0355938 A1 | 12/2017 | Lee et al. |

WATER-SOLUBLE POLYVINYL ALCOHOL BLEND FILM, RELATED METHODS, AND RELATED ARTICLES

FIELD OF THE INVENTION

The present disclosure relates generally to water-soluble films and related packets. More particularly the disclosure relates to polyvinyl alcohol based water-soluble films which include a blend of polyvinyl alcohol (PVOH) resins and which can be used for contact with liquids, solids, or combinations thereof with one or more benefits such as maintaining film stiffness and maintaining pouch tautness when enclosing liquid compositions, such as low molecular weight polyols, without compromising film solubility.

BACKGROUND

Water-soluble polymeric films are commonly used as packaging materials to simplify dispersing, pouring, dissolving and dosing of a material to be delivered. For example, pouches made from water-soluble film are commonly used to package household care compositions such as laundry and dish detergents. A consumer can directly add the pouched composition to a mixing vessel, such as a bucket, sink or washing machine. Advantageously, this provides for accurate dosing while eliminating the need for the consumer to measure the composition. The pouched composition may also reduce mess that would be associated with dispensing a similar composition from a vessel, such as pouring a liquid laundry detergent from a bottle. In sum, soluble pre-measured polymeric film pouches provide for convenience of consumer use in a variety of applications.

Some water-soluble polymeric films that are used to make currently marketed pouches interact with the pouch components (e.g., detergents), which affects the properties of the pouch, for example the ability to maintain film stiffness. For example, pouches may demonstrate film softening over time when in contact with contents therein, such as liquid solvents commonly used in liquid detergent compositions, and low molecular weight polyols. Such softening can, for example, reduce the tautness of the pouch and impart on the pouch a loose and droopy appearance and feel. In another type of problem, the clarity of the film may be affected by a blooming effect of pouch components migrating through the film. In another type of problem, the solubility of the film may decrease over time when in contact with contents therein, resulting in undesirable residue remaining after a wash. In another type of problem, the mechanical properties of the film may change over time when in contact with the contents therein, resulting in undesirable stiffening of the film or increased brittleness of the film.

Additionally, the COMMISSION REGULATION (EU) No. 1297/2014 of 5 Dec. 2014 amended, for the purposes of its adaptation to technical and scientific progress, Regulation (EC) No. 1272/2008 of the European Parliament and of the Council on classification, labeling and packaging of substances and mixtures to require additional provisions for liquid consumer laundry detergent in dosages for single use contained in a soluble packaging. Among those provisions were the requirements that the soluble packaging shall retain its liquid content for at least 30 seconds when the soluble packaging is placed in water at 20° C. Naturally, the film must thereafter disintegrate and preferably completely dissolve, to release the contents of the pouch.

Thus, there exists a need in the art for a water soluble film that is water soluble and can be formed into packages for holding liquid compositions, which can be thermoformed or vertical form filled, that maintain film stiffness and remain taut, and/or maintain acceptable clarity properties, without impairing the ultimate solubility of the water-soluble film.

SUMMARY

One aspect of the disclosure provides a water-soluble film including a polyvinyl alcohol (PVOH) resin blend including a first PVOH copolymer including a first anionic monomer unit, the first anionic monomer unit comprising maleic anhydride or an alkali metal salt of maleic anhydride, wherein the first anionic monomer unit is present in the first PVOH copolymer in an amount between about 1 mol % and about 3 mol %, and a second PVOH copolymer including a second anionic monomer unit, wherein the second anionic monomer unit is present in the second PVOH copolymer in an amount between about 3 mol % and 10 mol %; the amount of first anionic monomer unit present in the first PVOH copolymer is different from the amount of second anionic monomer unit present in the second PVOH copolymer, and optionally the first PVOH copolymer is provided in the blend in an amount in a range of about 10 wt. % to about 70 wt. %, based on the total weight of the PVOH resin blend.

Another aspect of the disclosure provides an article comprising the water-soluble film of the disclosure in the form of a pouch defining an interior pouch volume, and optionally including a liquid composition in the interior pouch volume.

Further aspects and advantages will be apparent to those of ordinary skill in the art from a review of the following detailed description. While the film, pouch, and their methods of making are susceptible of embodiments in various forms, the description hereafter includes specific embodiments with the understanding that the disclosure is illustrative, and is not intended to limit the invention to the specific embodiments described herein.

DETAILED DESCRIPTION

Figure 1:
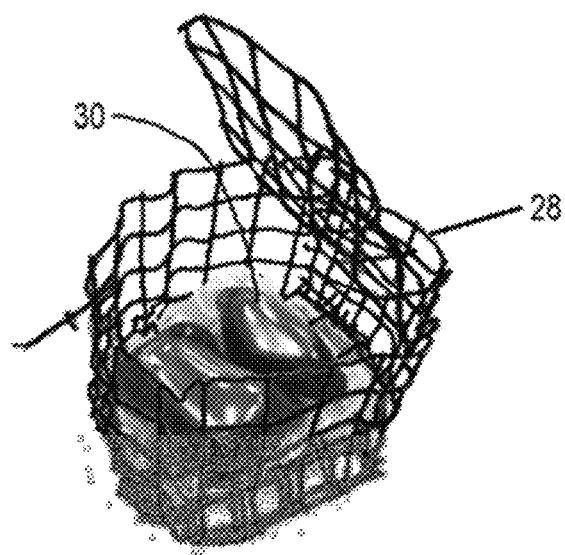
FIG. 1 is an illustration of a wire frame cage (shown with the top open, to better illustrate water-soluble pouches contained therein) for use in the Liquid Release Test described herein.

One aspect of the disclosure provides a water-soluble film including a polyvinyl alcohol (PVOH) resin blend including a first PVOH copolymer including a first anionic monomer unit, the first anionic monomer unit comprising maleic anhydride or an alkali metal salt of maleic anhydride, wherein the first anionic monomer unit is present in the first PVOH copolymer in an amount between about 1 mol % and about 3 mol %, and a second PVOH copolymer including a second anionic monomer unit, wherein the second anionic monomer unit is present in the second PVOH copolymer in an amount between about 3 mol % and 10 mol %; wherein the first PVOH copolymer is provided in the blend in an amount in a range of about 10 wt. % to about 70 wt. %, based on the total weight of the PVOH resin blend, and the amount of first anionic monomer unit present in the first PVOH copolymer is different from the amount of second anionic monomer unit present in the second PVOH copolymer.

In embodiments, the first PVOH copolymer is present in an amount in a range from about 10 wt. % to about 40 wt. % of total weight of the PVOH resin blend. In embodiments, the second PVOH copolymer is present in an amount in a range of from about 30 wt. % to about 90 wt. %, or about 60 wt. % to about 80 wt. % of the total weight of the PVOH resin blend.

In embodiments of the disclosure, the first and second PVOH copolymers include pendant groups provided by the anionic monomer unit. A pendant group, as used herein, includes pendant groups from any monomer copolymerized with a vinyl ester and does not include residual ester groups or hydrolyzed ester groups from the vinyl ester. For example, acetate groups from polymerization of vinyl acetate and hydroxyl groups formed from hydrolyzing residual acetate groups are not considered pendant groups. In embodiments, the first PVOH copolymer has a first level of pendant groups ($a_1$) and the second PVOH copolymer has a second level of pendant groups ($a_2$), wherein the difference between $a_1$ and $a_2$ is from about 2 mol % to about 15 mol %. The first pendant group and the second pendant group may be together present in a combined amount in a range of about 8 mol % to 25 mol %. In embodiments, the first PVOH copolymer is maleic anhydride copolymer having a first level of anionic monomer incorporation ($b_1$), the second PVOH copolymer is a maleic anhydride copolymer having a second level of anionic monomer incorporation ($b_2$), wherein the difference between $b_1$ and $b_2$ is from about 2 to 3 mol %. In embodiments, the first PVOH copolymer has a 4% solution viscosity at 20° C. in a range of about 4 cP to about 30 cP. In embodiments, the second PVOH copolymer has a 4% solution viscosity at 20° C. in a range of about 12 cP to about 30 cP.

In embodiments, the water-soluble film has a residue value of about 20 wt. % or less as measured by the Dissolution Chamber Test ("DC Residue"). In embodiments, the water-soluble film has a swelling ratio value that is no greater than 60% of the swelling ratio value of a comparative film which is identical but for the second PVOH copolymer being the sole resin and the amount of that second PVOH copolymer in the comparative film being equal to the total amount of resins in the inventive water-soluble film.

In embodiments, the PVOH resin blend consists essentially of the first PVOH copolymer and the second PVOH copolymer. In embodiments, the water-soluble film further comprises at least a third water-soluble polymer which is other than a PVOH polymer. In embodiments, the first PVOH copolymer and the second PVOH copolymer each independently have a degree of hydrolysis in a range of about 75% to about 99%.

In embodiments, the first PVOH copolymer includes a first anionic monomer unit selected from one or more of maleic anhydride monomer and an alkali metal salt of maleic anhydride, the first PVOH copolymer is present in an amount in a range from about 10 wt % to about 70 wt % of total weight of the PVOH resin blend, the second PVOH copolymer includes a second anionic monomer unit selected from the group consisting of maleic anhydride and an alkali metal salt of maleic anhydride, the second PVOH copolymer is present in an amount in a range of about 30 wt % to about 90 wt % of total weight of the PVOH resin blend, wherein the difference between $a_1$ and $a_2$ is from about 3 mol % to about 6 mol %, $a_1$ is in a range of about 3 mol % to about 5 mol %, $a_2$ is in a range of about 7 mol % to about 9 mol %, and the first pendant group and the second pendant group are together present in a combined amount in a range of about 2 mol % to 15 mol %.

In embodiments, the first PVOH copolymer comprises a maleic anhydride monomer unit and is present in an amount in a range of from about 10 wt. % to about 60 wt. % of the total weight of the PVOH resin blend, and the water-soluble film further includes a plasticizer in an amount of at least 30 PHR.

In embodiments, the first PVOH copolymer comprises a maleic anhydride monomer unit and is present in an amount in a range of from about 10 wt. % to about 60 wt. % of the total weight of the PVOH resin blend, and the water-soluble film further includes a first plasticizer having a molar mass greater than or equal to 92 g/mol and a second plasticizer having a molar mass greater than or equal to 150 g/mol. Optionally, the water soluble film may further comprise a third plasticizer.

In embodiments, the first PVOH copolymer comprises a maleic anhydride monomer unit and is present in an amount in a range of from about 10 wt. % to about 70 wt. % of the total weight of the PVOH resin blend, and the water-soluble film further includes at least 2 PHR of a filler selected from a bulking agent, an anti-blocking agent, or combinations thereof.

Another aspect of the disclosure provides an article comprising the water-soluble film of the disclosure in the form of a pouch defining an interior pouch volume. In embodiments, the article further includes a composition contained in the interior pouch volume. Optionally, the composition contained in the interior pouch volume is a liquid composition. Optionally, the liquid composition is a liquid detergent. Optionally, the liquid detergent includes a low molecular weight polyol. Optionally, the composition contained in the interior pouch volume is a solid.

In embodiments, the composition contained in the interior pouch volume is a liquid and the article has a delayed release time of at least 30 seconds as measured by the Liquid Release Test. In embodiments, the composition contained in the interior pouch volume is a liquid and the article has a compression strength greater than 300 N as measured by the Compression Test Measurement. In embodiments, the composition contained in the interior pouch volume is a liquid and the article has a compression strength less than 2000 N as measured by the Compression Test Measurement.

"Comprising" as used herein means that various components, ingredients or steps that can be conjointly employed in practicing the present disclosure. Accordingly, the term "comprising" encompasses the more restrictive terms "consisting essentially of" and "consisting of." The present compositions can comprise, consist essentially of, or consist of any of the required and optional elements disclosed herein. For example, a thermoformed packet can "consist essentially of" a film described herein for use of it thermoforming characteristics, while including a non-thermoformed film (e.g., lid portion), and optional markings on the film, e.g. by inkjet printing. The invention illustratively disclosed herein suitably may be practiced in the absence of any element or step which is not specifically disclosed herein.

All percentages, parts and ratios referred to herein are based upon the total dry weight of the film composition or total weight of the packet content composition of the present disclosure, as the case may be, and all measurements made are at about 25° C., unless otherwise specified. All such weights as they pertain to listed ingredients are based on the active level and therefore do not include carriers or byproducts that may be included in commercially available materials, unless otherwise specified.

All ranges set forth herein include all possible subsets of ranges and any combinations of such subset ranges. By default, ranges are inclusive of the stated endpoints, unless stated otherwise. Where a range of values is provided, it is understood that each intervening value between the upper and lower limit of that range and any other stated or intervening value in that stated range, is encompassed within the disclosure. The upper and lower limits of these smaller ranges may independently be included in the smaller ranges, and are also encompassed within the disclosure, subject to any specifically excluded limit in the stated range. Where the stated range includes one or both of the limits, ranges excluding either or both of those included limits are also contemplated to be part of the disclosure.

It is expressly contemplated that for any number value described herein, e.g. as a parameter of the subject matter described or part of a range associated with the subject matter described, an alternative which forms part of the description is a functionally equivalent range surrounding the specific numerical value (e.g. for a dimension disclosed as "40 mm" an alternative embodiment contemplated is "about 40 mm").

As used herein, the terms packet(s) and pouch(es) should be considered interchangeable. In certain embodiments, the terms packet(s) and pouch(es), respectively, are used to refer to a container made using the film, and to a fully-sealed container preferably having a material sealed therein, e.g., in the form a measured dose delivery system. The sealed pouches can be made from any suitable method, including such processes and features such as heat sealing, solvent welding, and adhesive sealing (e.g., with use of a water-soluble adhesive).

As used herein and unless specified otherwise, the terms "wt. %" and "wt %" are intended to refer to the composition of the identified element in "dry" (non water) parts by weight of the entire film, including residual moisture in the film (when applicable) or parts by weight of the entire composition enclosed within a pouch (when applicable).

As used herein and unless specified otherwise, the term "PHR" ("phr") is intended to refer to the composition of the identified element in parts per one hundred parts water-soluble polymer resin (whether PVOH or other polymer resins, unless specified otherwise) in the water-soluble film, or a solution used to make the film.

The film can be made by any suitable method, including a solution casting method. The film can be used to form a container (pouch) by any suitable process, including vertical form, fill, and sealing (VFFS), or thermoforming. The film can be sealed by any suitable process including, for example, solvent sealing or heat sealing of film layers, e.g. around a periphery of a container. The pouches can be used for dosing materials to be delivered into bulk water, for example.

The film, pouches, and related methods of making and use are contemplated to include embodiments including any combination of one or more of the additional optional elements, features, and steps further described below (including those shown in the Examples and figures), unless stated otherwise.

In any embodiment, the water-soluble pouch can contain (enclose) a composition. The composition can be selected from a liquid, solid or combination thereof. As used herein, "liquid" includes free-flowing liquids, as well as pastes, gels, foams and mousses. Non-limiting examples of liquids include light duty and heavy duty liquid detergent compositions, fabric enhancers, detergent gels commonly used for laundry, bleach and laundry additives. Non-limiting examples of liquids include agricultural compositions, automotive compositions, aviation compositions, food and nutritive compositions, industrial compositions, livestock compositions, marine compositions, medical compositions, mercantile compositions, military and quasi-military compositions, office compositions, and recreational and park compositions, pet compositions, water-treatment compositions, including cleaning and detergent compositions applicable to any such use. Gases, e.g., suspended bubbles, or solids, e.g. particles, may be included within the liquids. A "solid" as used herein includes, but is not limited to, powders, agglomerates, and mixtures thereof. Non-limiting examples of solids include: granules, micro-capsules, beads, noodles, and pearlised balls. Solid compositions may provide a technical benefit including, but not limited to, through-the-wash benefits, pre-treatment benefits, and/or aesthetic effects.

In any of the laundry-centric embodiments, the composition may be selected from the group of liquid light duty and liquid heavy duty liquid detergent compositions, powdered detergent compositions, fabric enhancers, detergent gels commonly used for laundry, and bleach (e.g., organic or inorganic bleach) and laundry additives, for example.

Water-Soluble Film

The film and related pouches described herein comprise a water-soluble film. In one aspect, the water-soluble film comprises a polyvinyl alcohol (PVOH) resin blend comprising a first PVOH copolymer comprising a first anionic monomer unit selected from the group consisting of alkyl acrylates, alkyl alkacrylates, hydrolyzed alkali metal salts of the foregoing, and combinations of the foregoing, and a second PVOH copolymer comprising a second anionic monomer unit. The film can have any suitable thickness, and a film thickness of about 76 microns (μm) is typical and particularly contemplated. Other values and ranges contemplated include values in a range of about 5 to about 200 μm, or in a range of about 20 to about 100 μm, or about 40 to about 90 μm, or about 50 to 80 μm, or about or about 60 to 65 μm for example 65 μm, 76 μm, or 88 μm.

PVOH Resin

Polyvinyl alcohol is a synthetic resin generally prepared by the alcoholysis, usually termed hydrolysis or saponification, of polyvinyl acetate. Fully hydrolyzed PVOH, where virtually all the acetate groups have been converted to alcohol groups, is a strongly hydrogen-bonded, highly crystalline polymer which dissolves only in hot water—greater than about 140° F. (about 60° C.). If a sufficient number of acetate groups are allowed to remain after the hydrolysis of polyvinyl acetate, that is the PVOH polymer is partially hydrolyzed, then the polymer is more weakly hydrogen-bonded, less crystalline, and is generally soluble in cold water—less than about 50° F. (about 10° C.). As such, the partially hydrolyzed polymer is a vinyl alcohol-vinyl acetate copolymer that is a PVOH copolymer, but is commonly referred to as PVOH.

In particular, the PVOH resin will include a partially or fully hydrolyzed PVOH copolymer that includes an anionic monomer unit, a vinyl alcohol monomer unit, and optionally a vinyl acetate monomer unit.

Water-soluble polymeric films based on PVOH can be subject to changes in solubility characteristics. The acetate group in the co-poly(vinyl acetate vinyl alcohol) polymer is known by those skilled in the art to be hydrolysable by either acid or alkaline hydrolysis. As the degree of hydrolysis increases, a polymer composition made from the PVOH homopolymer resin will have increased mechanical strength but reduced solubility at lower temperatures (e.g., requiring hot water temperatures for complete dissolution). Accordingly, exposure of a PVOH homopolymer resin to an alkaline environment (e.g., resulting from a laundry bleaching additive) can transform the resin from one which dissolves rapidly and entirely in a given aqueous environment (e.g., a cold water medium) to one which dissolves slowly and/or incompletely in the aqueous environment, potentially resulting in undissolved polymeric residue at the end of a wash cycle. This is an inherent weakness in the application of films based on just the vinyl acetate/alcohol co-polymer typified by commercial PVOH homopolymer resins.

PVOH copolymer resins with pendant carboxyl groups, such as, for example, vinyl alcohol/hydrolyzed methyl acrylate sodium salt resins, can form lactone rings between neighboring pendant carboxyl and alcohol groups, thus reducing the water solubility of the PVOH copolymer resin. In the presence of a strong base such as a laundry bleaching additive, the lactone rings can open over the course of several weeks at relatively warm (ambient) and high humidity conditions (e.g., via lactone ring-opening reactions to form the corresponding pendant carboxyl and alcohol groups with increased water solubility). Thus, contrary to the effect observed with PVOH homopolymer films, it is believed that such a PVOH copolymer film can become more soluble due to chemical interactions between the film and an alkaline composition inside the pouch during storage. Consequently, as they age, the packets may become increasingly prone to premature dissolution during a hot wash cycle (nominally 40° C.), and may in turn decrease the efficacy of certain laundry actives due to the presence of the bleaching agent and the resulting pH influence.

In formulating a suitable film for a given application (e.g., a composition-in-pouch article for a washing operation), multiple factors must be taken in to account. These factors include: (1) film strength, where a higher strength desirably translates into stronger pouch seals when the film is the weak link in a seal; (2) change in film modulus after exposure to a liquid, where a positive change in modulus desirably provides a lower likelihood to soften, loosen, and droop when formulated into a pouch encapsulating a liquid composition and/or deform and stick to other films when loaded on top of each other during production or in final consumer packaging; (3) film swelling ratio value after exposure to a liquid solution, wherein the lower the swelling ratio value desirably provides a greater film stiffness, a smaller change in film area (length×width) after exposure to the liquid solution, and a greater pouch tautness and lower likelihood to soften, loosen, and droop when formulated into a pouch encapsulating a liquid composition; (4) dissolution residue, where a lower residue value desirably lessens the likelihood of residual film remaining after aggressive washing conditions (e.g., low water (such as in overloading of a washing machine) and cold wash water conditions); (5) degree and type of anionic modification, where certain modifications in the polymer desirably reduce the risk of blooming of pouch components, such as plasticizers, and/or softening of the film when the film is formulated into a pouch encapsulating a composition; and (6) film crystallinity, where a lower crystallinity value desirably lessens the likelihood of residual film remaining after aggressive washing conditions and a higher crystallinity value desirably lessens the likelihood of softening, loosening, or drooping when formulated into a pouch encapsulating a liquid composition. Often, water-soluble polymer resins, whether PVOH or otherwise, may have suitable characteristics with respect to some of these factors, but they can have poor characteristics with respect to other of these factors. Accordingly, it would be desirable to provide a water-soluble film in which many, if not all, of these factors have favorable properties in the film.

Accounting for these factors, the present disclosure includes a water-soluble film including a polyvinyl alcohol (PVOH) resin blend and optionally one or more additional components including plasticizers, fillers, surfactants, and other additives as described in more detail below. The PVOH resin blend includes a first PVOH resin which is a PVOH copolymer ("first PVOH copolymer") including one or more types of anionic monomer units (e.g., a PVOH ter- (or higher co-) polymer) and a second PVOH resin which is a PVOH copolymer ("second PVOH copolymer") including one or more types of anionic monomer units (e.g., a PVOH ter- (or higher co-) polymer). In some aspects, the PVOH resin blend includes only the first PVOH copolymer and the second PVOH copolymer (e.g., a binary blend of the two polymers). Alternatively or additionally, the PVOH resin blend, the water-soluble film, or both can be characterized as being free or substantially free from other polymers (e.g., other water-soluble polymers generally, other PVOH-based polymers specifically, or both). As used herein, "substantially free" means that the first and second PVOH copolymers make up at least 95 wt. %, at least 97 wt. %, or at least 99 wt. % of the total amount of water-soluble polymers in the water-soluble film. In other aspects, the water-soluble film can include one or more additional water-soluble polymers. For example, the PVOH resin blend can include a third PVOH polymer, a fourth PVOH polymer, a fifth PVOH polymer, etc. (e.g., one or more additional PVOH homopolymers or PVOH copolymers, with or without anionic monomer units). For example, the water-soluble film can include at least a third (or fourth, fifth, etc.) water-soluble polymer which is other than a PVOH polymer (e.g., other than PVOH homopolymers or PVOH copolymers, with or without anionic monomer units).

The PVOH copolymer (e.g., the first PVOH copolymer, the second PVOH copolymer, and any other PVOH copolymers in the resin blend) can be a PVOH terpolymer including vinyl alcohol monomer units, vinyl acetate monomer units (i.e., when not completely hydrolyzed), and a single type of anionic monomer unit (e.g., a where a single type of monomer unit can include equivalent acid forms, salt forms, and optionally ester forms of the anionic monomer unit). In some aspects, the PVOH copolymer can include two or more types of anionic monomer units. General classes of anionic monomer units which can be used for the PVOH copolymer include the vinyl polymerization units corresponding to monocarboxylic acid vinyl monomers, their esters and anhydrides, dicarboxylic monomers having a polymerizable double bond, their esters and anhydrides, and alkali metal salts of any of the foregoing. Examples of suitable anionic monomer units include the vinyl polymerization units corresponding to vinyl anionic monomers including vinyl acetic acid, maleic acid, monoalkyl maleate, dialkyl maleate, maleic anhydride, fumaric acid, monoalkyl fumarate, dialkyl fumarate, fumaric anhydride, itaconic acid, monoalkyl itaconate, dialkyl itaconate, itaconic anhydride, citraconic acid, monoalkyl citraconate, dialkyl citraconate, citraconic anhydride, mesaconic acid, monoalkyl mesaconate, dialkyl mesaconate, mesaconic anhydride, glutaconic acid, monoalkyl glutaconate, dialkyl glutaconate, glutaconic anhydride, alkyl acrylates, alkyl alkacrylates, alkali metal salts of the foregoing, hydrolyzed alkali metal salts of the foregoing, esters of the foregoing, and combinations of the foregoing.

In one type of embodiment, the PVOH is a carboxyl group modified copolymer. In another aspect, the PVOH can be modified with a dicarboxyl type monomer. In one class of these embodiments, the α carbon of both carbonyls are connected to the unsaturated bond (e.g., maleic acid, fumaric acid). In another class of these embodiments, the α carbon of both carbonyls are connected to the unsaturated bond and the unsaturated bond is further substituted, e.g., with a methyl branch (e.g., citraconic acid, mesaconic acid). In another class of these embodiments, the β carbon of one carbonyl and the α carbon of the other carbonyl are connected to the unsaturated bond (e.g., itaconic acid, cis-glutaconic acid, trans-glutaconic acid). Monomers that provide alkyl carboxyl groups are contemplated. A maleate type (e.g., dialkyl maleate or monoalkyl maleate, including monomethyl maleate) comonomer is particularly contemplated.

In embodiments, the first PVOH copolymer includes a first anionic monomer selected from the group consisting of maleic anhydride, alkali metal salts of maleic anhydride, and combinations of the foregoing. In embodiments, the second PVOH copolymer includes a second anionic monomer selected from the group consisting of maleic anhydride, alkali metal salts thereof, and combinations of the foregoing.

The level of incorporation of the one or more anionic monomer units in the PVOH copolymers (i.e., the degree of anionic modification of the PVOH copolymer) is not particularly limited. In embodiments, the one or more anionic monomer units are present in the PVOH copolymer in an amount in a range of about 1 mol. % or 2 mol. % to about 6 mol. % or 10 mol. % (e.g., at least 1.0, 1.5, 2.0, 2.5, 3.0, 3.5, or 4.0 mol. % and/or up to about 3.0, 4.0, 4.5, 5.0, 6.0, 8.0, or 10 mol. % in various embodiments).

The PVOH copolymers can also be characterized by the level of pendant carboxyl groups present in the copolymer. PVOH copolymer resins with pendant carboxyl groups can form lactone rings between neighboring pendant carboxyl and alcohol groups. The lactone rings can be opened in the presence of a caustic agent, as is known in the art. A lactone-containing polymer can be caustically treated such that all of the lactone rings are opened or only some of the rings are opened. For example, lactone rings form in PVOH-methyl acrylate copolymers and can be treated such that, for example, 70% of the lactone rings are opened. Accordingly, the level of pendant groups represents the maximum amount of pendant groups that can be present in a copolymer, based on the level of pendant group incorporation in the copolymer, regardless of whether those pendant groups are free or in the form of lactone rings, e.g., with neighboring alcohol groups. The level of pendant groups present the copolymer may or may not correspond to the level of incorporation of the anionic monomer units. For example, if methyl acrylate is incorporated into the PVOH at a level of 5 mol %, the resulting copolymer has about 5 mol % pendant groups, even if only 70% of the lactone rings are opened (i.e., 3.5 mol %). Additionally, if the anionic monomer is a dicarboxylate, such as a maleic anhydride salt, acid or an ester thereof, the copolymer includes two pendant units per anionic monomer unit incorporated into the copolymer.

The level of pendant groups in the PVOH copolymers is not particularly limited. In embodiments, the pendant groups are present in the PVOH copolymer in an amount in a range of about 0.5 mol. %, 1 mol. %, 2 mol. %, 2.5 mol. %, or 3 mol. %, to about 6 mol. % or 10 mol. % (e.g., at least 0.5, 1.0, 1.5, 2.0, 2.5, 3.0, 3.5, 4.0, 4.5, or 5.0 mol. % and/or up to about 3.0, 4.0, 4.5, 5.0, 6.0, 7.0, 8.0, or 10 mol. % in various embodiments). The PVOH resin blend may have an arithmetic weighted average amount of pendant groups ($\overline{P}$) in a range of about 2 mol % to about 10 mol %. That is, the first pendant group and the second pendant group together are present in a combined amount in a range of about 2 mol % to about 10 mol %, about 2 mol % to about 15 mol, about 3 mol. % to about 9 mol. %, about 4 mol % to about 15 mol %, or about 5 mol % to about 15 mol %. The arithmetic weighted average of the pendant groups $\overline{P}$ is calculated by the formula $\overline{P}=\Sigma(W_i \cdot P_i)$ wherein $W_i$ is the weight percentage of the respective PVOH copolymer and $P_i$ is the respective mol % of pendant groups in the PVOH copolymer.

The water-soluble film can contain at least about 50 wt. %, 55 wt. %, 60 wt. %, 65 wt. %, 70 wt. %, 75 wt. %, 80 wt. %, 85 wt. %, or 90 wt. % and/or up to about 60 wt. %, 70 wt. %, 80 wt. %, 90 wt. %, 95 wt. %, or 99 wt. % of the PVOH resin blend. In embodiments, the first PVOH copolymer is present in the water-soluble film in an amount in a range of about 10 wt. % to about 70 wt. % (or about 10 wt. % to about 60 wt. %, about 15 wt. % to about 55 wt. %, or about 20 wt. % to about 50 wt %, or about 10 wt. % to about 50 wt. %, or about 10 wt. % to about 40 wt. %) of total PVOH polymers and PVOH copolymers in the film (i.e., relative to the PVOH resin blend weight). For example, the first PVOH copolymer can be present in an amount of at least 10 wt. %, 15 wt. %, 20 wt. %, 25 wt. %, 30 wt. %, 35 wt. %, 40 wt. %, 45 wt. %, or 50 wt. % and/or up to about 40 wt. %, 45 wt. %, 50 wt. %, 55 wt. %, 60 wt. %, 70 wt. %, or 80 wt. % of total PVOH polymers and PVOH copolymers in the film. In embodiments, the foregoing concentrations of first PVOH copolymer alternatively or additionally can be relative to total water-soluble polymer content in film, PVOH or otherwise.

In embodiments, the second PVOH copolymer is present in the water-soluble film in an amount in a range of about 30 wt. % to about 90 wt. % (or about 40 wt. % to about 90 wt. %, about 65 wt. % to about 85 wt. %, or about 20 wt. % to about 80 wt %, or about 50 wt. % to about 90 wt. %, or about 60 wt. % to about 90 wt. %) of total PVOH polymers and PVOH copolymers in the film (i.e., relative to the PVOH resin blend weight). In another aspect, the foregoing concentrations of second PVOH copolymer alternatively or additionally can be relative to total water-soluble polymer content in film, PVOH or otherwise. In embodiments, the first PVOH copolymer can be present in an amount of at least 10 wt. %, 15 wt. %, 20 wt. %, 25 wt. %, 30 wt. %, 35 wt. %, 40 wt. %, 45 wt. %, or 50 wt. % and/or up to about 40 wt. %, 45 wt. %, 50 wt. %, 55 wt. %, 60 wt. %, 70 wt. %, or 80 wt. %, of total PVOH polymers and PVOH copolymers in the film and the second PVOH copolymer can be present in an amount of at least 30 wt. %, 40 wt. %, 45 wt. %, 50 wt. %, 55 wt. %, 60 wt. %, or 65 wt. % and/or up to about 60 wt. %, 65 wt. %, 70 wt. %, 75 wt. %, 80 wt. %, 85 wt. %, or 90 wt. % of total PVOH polymers and PVOH copolymers in the film.

In an aspect of the water-soluble film, the first PVOH copolymer includes a first level of incorporation of anionic monomer units (i.e., a first level of anionic modification), and the second PVOH copolymer includes a second level of incorporation of anionic monomer units (i.e., a second level of anionic modification). It will be understood that the first level of incorporation of anionic monomer units is different from the second level of incorporation of anionic monomer units in the various embodiments. For reference, the first PVOH copolymer is denoted as having a first level of pendant groups ($a_1$) and a first level of incorporation ($b_1$) of the anionic monomer units and the second PVOH copolymer is denoted as having a second level of pendant groups ($a_2$) and a second level of incorporation ($b_2$) of the anionic monomer units.

In a refinement of this aspect, the first and second PVOH copolymers are selected such that the difference between $a_1$ and $a_2$ is in a range of about 0.5 mol. % to about 18 mol. % (or about 1 mol. % to about 18 mol. %, about 2 mol. % to about 16 mol. %, about 3 mol. % to 14 mol. %, about 4 mol. % to about 10 mol. %, about 4 mol. % to about 8 mol. %, about 3 mol. % to 6 mol. %, or about 4 mol. % to about 5 mol. %), and it more generally can be at least 0.5, 1, 2, or 4 mol. % and/or up to about 1, 2, 3, 4, 5, 10, 12, 14, 16, or 18 mol. %. Individually, the level of pendant groups ($a_1$) for the first PVOH copolymer can be in a range of about 2 mol. % to about 6 mol. % (or about 3 mol % to about 6 mol %, about 3 mol. % to about 5 mol. %, about 3 mol. % to about 4 mol. %, about 4 mol. % to about 6 mol. %, or about 2 mol. %, about 2.5 mol. %, about 3 mol. %, about 3.5 mol. %, about 4 mol. %, about 4.5 mol. %, about 5 mol. %, about 5.5 mol. %, or about 6 mol. %). Alternatively or additionally, the level of pendant groups ($a_2$) for the second PVOH copolymer can be in a range of about 6 mol. % to about 20 mol. % (or about 6 mol % to about 16 mol %, about 6 mol. % to about 10 mol. %, or about 7 mol. % to about 9 mol. %, or about 6 mol. %, about 6.5 mol. %, about 7 mol. %, about 7.5 mol. %, about 8 mol. %, about 8.5 mol. %, about 9 mol. %, about 9.5 mol. %, about 10 mol. %, about 10.5 mol. %, about 11 mol. %, about 11.5 mol. %, or about 12 mol. %).

In embodiments, the first and second PVOH copolymers are selected such that the difference between $b_1$ and $b_2$ is in a range of about 0.2 mol. % to about 9 mol. % (or about 0.3 mol. % to about 8 mol. %, about 0.4 mol % to about 7 mol. %, about 0.5 mol % to about 6 mol %, about 1 mol % to about 5 mol %, about 1.5 mol % to about 4 mol. %, about 2 mol. % to about 3 mol. %, for example at least 0.2, 0.3, 0.4, 0.6, 0.8, 1.0, 1.25, 1.5, 1.75, 2.0, 2.25, 2.5, 2.75, or 3.0 mol. % and/or up to about 2.5, 3.0, 3.5, 4.0, 4.5, 5.0, 6.0, 7.0, 8.0, or 9.0 mol. %. Individually, the first level of incorporation ($b_1$) for the anionic monomer unit can be in a range of about 1 mol. % to about 3 mol. % (or about 1.5 mol. % to about 3 mol. %, about 1.5 mol % to about 2.5 mol. %, or about 1.5 mol. % to about 2 mol. %, for example, about 1.75 mol. %) in the first PVOH copolymer. Alternatively or additionally, the second level of incorporation ($b_2$) for the anionic monomer unit can be in a range of about 3 mol. % to about 10 mol. % (or about 3 mol. % to about 8 mol. %, about 3 mol. % to about 5 mol. %, about 3.5 mol. % to about 4.5 mol. %, for example, about 4 mol. %) in the second PVOH copolymer.

The degree of hydrolysis (DH) of the PVOH homopolymers and PVOH copolymers included in the water-soluble films of the present disclosure can be in a range of about 75% to about 99% (e.g., about 79% to about 92%, about 88% to 92%, about 86.5% to about 89%, or about 88%, 90%, 91% or 92% such as for cold-water soluble compositions; about 90% to about 99%, about 92% to about 99%, about 95% to about 99%, about 98%, about 99%, or greater than 99%). As the degree of hydrolysis is reduced, a film made from the resin will have reduced mechanical strength but faster solubility at temperatures below about 20° C. As the degree of hydrolysis increases, a film made from the polymer will tend to be mechanically stronger and the thermoformability will tend to decrease. The degree of hydrolysis of the PVOH can be chosen such that the water-solubility of the polymer is temperature dependent, and thus the solubility of a film made from the polymer and additional ingredients is also influenced. In one option the film is cold water-soluble. For a co-poly(vinyl acetate vinyl alcohol) polymer that does not include any other monomers (e.g., not copolymerized with an anionic monomer) a cold water-soluble film, soluble in water at a temperature of less than 10° C., can include PVOH with a degree of hydrolysis in a range of about 75% to about 90%, or in a range of about 80% to about 90%, or in a range of about 85% to about 90%. In another option the film is hot water-soluble. For a co-poly (vinyl acetate vinyl alcohol) polymer that does not include any other monomers (e.g., not copolymerized with an anionic monomer) a hot water-soluble film, soluble in water at a temperature of at least about 60° C., can include PVOH with a degree of hydrolysis of at least about 98%.

The degree of hydrolysis of the resin blend can also be characterized by the arithmetic weighted, average degree of hydrolysis ($\overline{H}°$). For example, $\overline{H}°$ for a PVOH resin that comprises two or more PVOH polymers is calculated by the formula $\overline{H}°=\Sigma(W_i \cdot H_i)$ where $W_i$ is the weight percentage of the respective PVOH polymer and $H_i$ is the respective degrees of hydrolysis.

The viscosity of a PVOH polymer ($\mu$) is determined by measuring a freshly made solution using a Brookfield LV type viscometer with UL adapter as described in British Standard EN ISO 15023-2:2006 Annex E Brookfield Test method. It is international practice to state the viscosity of 4% aqueous polyvinyl alcohol solutions at 20° C. All viscosities specified herein in Centipoise (cP) should be understood to refer to the viscosity of 4% aqueous polyvinyl alcohol solution at 20° C., unless specified otherwise. Similarly, when a resin is described as having (or not having) a particular viscosity, unless specified otherwise, it is intended that the specified viscosity is the average viscosity for the resin, which inherently has a corresponding molecular weight distribution.

For reference, the first PVOH copolymer is denoted as having a first 4% solution viscosity at 20° C. ($\mu_1$), and the second PVOH copolymer is denoted as having a second 4% solution viscosity at 20° C. ($\mu_2$). In various embodiments, the first viscosity $\mu_1$ can be in a range of about 4 cP to about 30 cP (e.g., at least about 4, 8, 10, 12, or 16 cP and/or up to about 12, 16, 20, 24, or 30 cP, such as about 4 cP to about 24 cP, about 10 cP to about 16 cP, or about 10 cP to about 20 cP, about 20 cP to about 26 cP, or about 20 cP to about 30 cP). Alternatively or additionally, the second viscosity $\mu_2$ can be in a range of about 4 cP to about 30 cP (e.g., at least about 4, 8, 10, 12, or 16 cP and/or up to about 12, 16, 20, 24, or 30 cP, such as about 12 cP to about 30 cP, about 10 cP to about 16 cP, or about 10 cP to about 20 cP, or about 20 cP to about 30 cP). When the PVOH resin blend includes three or more PVOH resins selected from PVOH polymer and PVOH copolymer resins, the foregoing viscosity values can apply to each PVOH polymer or PVOH copolymer individually. It is well known in the art that the viscosity of PVOH resins is correlated with the weight average molecular weight ($\overline{M}w$) of the PVOH resin, and often the viscosity is used as a proxy for the $\overline{M}w$. Thus, the weight-average molecular weight of the water-soluble polymers, including the first PVOH copolymer and the second PVOH copolymer, can be in a range of about 30,000 to about 175,000, or about 30,000 to about 100,000, or about 55,000 to about 80,000, for example. When referring to average viscosity of the PVOH resin blend, the weighted natural log average viscosity ($\overline{\mu}$) is used. The $\overline{\mu}$ for a PVOH resin that comprises two or more PVOH polymers is calculated by the formula $\overline{\mu}=e^{\Sigma W_i \cdot \ln \mu_i}$ where $\mu_i$ is the viscosity for the respective PVOH polymers.

In another aspect of the water-soluble film, the first PVOH copolymer and the second PVOH copolymer are selected for the PVOH resin blend such that the resulting water-soluble film has maintained film stiffness and maintained pouch tautness (e.g., is less likely to loosen and droop) when in contact with liquid pouch contents, and preferably maintained or improved dissolution, residue, and mechanical properties as well. In some embodiments, the water-soluble film has the property in which (a) the water-soluble film has a residue value of about 20 wt. % or less, about 25 wt. % or less, about 30 wt. % or less, about 35 wt. % or less, about 40 wt. % or less, about 45 wt. % or less, or about 48 wt. % or less (e.g., in a range of about 1 wt. % to about 20 wt. %, about 3 wt. % to about 20 wt. %, about 5 wt. % to about 25 wt. %, about 12 wt. % to about 48 wt. %, about 25 wt. % to about 48 wt. %, about 10 wt. % to about 45 wt. %, about 20 wt. % to about 45 wt. %, or about 25 wt. % to about 40 wt. %) as measured by the Dissolution Chamber Test (described below). In some embodiments, the water-soluble film has the property in which (b) the water-soluble film has a crystallinity value of at least 15% (e.g., in a range of about 15% to about 50%, about 15% to about 40%, about 15% to about 35%, about 15% to about 30%, about 15% to about 25%, or about 15% to about 20%) as measured by the Crystallinity Test (described below). In some embodiments, the water soluble film has the property in which (c) the water-soluble film is resistant to the blooming effect as determined by visual inspection of the opacity of the film of the pouch material relative to the opacity of the film when made. In some embodiments, the water-soluble film has the property in which (d) the water soluble film has a swelling ratio value that is no greater than 60% of the swelling ratio value of an identically prepared film including only the second PVOH copolymer, as determined by the Film Swelling Test (described below). It will be appreciated that not each of properties (a) through (d) need to be satisfied to provide a water-soluble film having maintained film stiffness and maintained pouch tautness (e.g., is less likely to loosen and droop) when in contact with liquid pouch contents, and preferably maintained or improved dissolution, residue, and mechanical properties. For example, a water-soluble film having a crystallinity value of less than 15% that demonstrates maintained film stiffness and maintained pouch tautness can be designed, for example, by modifying the type and/or amount of plasticizer provided in the film. In various embodiments, the water-soluble film has the properties (a) and (b), (a) and (c), (a) and (d), (b) and (c), (b) and (d), (c) and (d), (a) and (b) and (c), (a) and (b) and (d), (a) and (c) and (d), (b) and (c) and (d), or (a) and (b) and (c) and (d). In general, water-soluble films that exhibit the aforementioned properties, exhibit the properties prior to exposure to a liquid composition (e.g. liquid laundry detergent) and maintain the aforementioned properties after exposure to a liquid composition. The water-soluble films of the disclosure "maintain" a property after exposure to a liquid composition if the property has a value after exposure to a liquid composition that is within the ranges disclosed herein for said property. The water-soluble films of the disclosure need not maintain the exact same value for a property after exposure to a liquid composition that the film exhibited prior to exposure to a liquid composition. For example, in one type of embodiment, the property after exposure can be within 20%, or within 10% of the original value and still within the range disclosed herein for the property.

The PVOH resin blends according to the disclosure unexpectedly permit the formulation of water-soluble films having a combination of desirable physical and chemical properties, even when the PVOH copolymers included in the resin blends are deficient individually with respect to one or more of physical or chemical properties. For example, each PVOH copolymer in the blend has at least one undesirable trait for a particular property, but the water-soluble film incorporating the blend achieves a desirable trait for the particular property of each PVOH copolymer. For example, the PVOH resin blend can include first and second PVOH copolymers such that a corresponding first PVOH copolymer water-soluble film has the property (a) and a corresponding second PVOH copolymer water-soluble film does not have the property (a). Alternatively or additionally, the PVOH resin blend can include first and second PVOH copolymers such that a corresponding first PVOH copolymer water-soluble film does not have the property (b); and a corresponding second PVOH copolymer water-soluble film has the property (b). Alternatively or additionally, the PVOH resin blend can include first and second PVOH copolymers such that a corresponding first PVOH copolymer water-soluble film does not have the property (c); and a corresponding second PVOH copolymer water-soluble film has the property (c). Alternatively or additionally, the PVOH resin blend can include first and second PVOH copolymers such that a corresponding first PVOH copolymer water-soluble film does not have the property (d); and a corresponding second PVOH copolymer water-soluble film has the property (d). A corresponding PVOH copolymer denotes a water-soluble film containing only the first PVOH copolymer or the second PVOH copolymer as the water-soluble polymer resin, but otherwise including the same type and amounts of plasticizers and other additives, having the same thickness, etc.

Other Water Soluble Polymers

Other water soluble polymers for use in addition to the first and second PVOH copolymers can include, but are not limited to a vinyl alcohol-vinyl acetate copolymer, sometimes referred to as a PVOH homopolymer, polyacrylates, water-soluble acrylate copolymers, polyvinyl pyrrolidone, polyethyleneimine, pullulan, water-soluble natural polymers including, but not limited to, guar gum, gum Acacia, xanthan gum, carrageenan, and starch, water-soluble polymer derivatives including, but not limited to, modified starches, ethoxylated starch, and hydroxypropylated starch, copolymers of the forgoing and combinations of any of the foregoing. Yet other water-soluble polymers can include polyalkylene oxides, polyacrylamides, polyacrylic acids and salts thereof, celluloses, cellulose ethers, cellulose esters, cellulose amides, polyvinyl acetates, polycarboxylic acids and salts thereof, polyaminoacids, polyamides, gelatines, methylcelluloses, carboxymethylcelluloses and salts thereof, dextrins, ethylcelluloses, hydroxyethyl celluloses, hydroxypropyl methylcelluloses, maltodextrins, polymethacrylates, and combinations of any of the foregoing. Such water-soluble polymers, whether PVOH or otherwise are commercially available from a variety of sources.

In embodiments, the PVOH resin blend consists essentially of the first PVOH copolymer and the second PVOH copolymer. In embodiments, the water-soluble film comprises at least a third water-soluble polymer which is other than a PVOH polymer.

The water-soluble film can contain other auxiliary agents and processing agents, such as, but not limited to, plasticizers, plasticizer compatibilizers, surfactants, lubricants, release agents, fillers, extenders, cross-linking agents, anti-blocking agents, antioxidants, detackifying agents, antifoams, nanoparticles such as layered silicate-type nanoclays (e.g., sodium montmorillonite), bleaching agents (e.g., sodium metabisulfite, sodium bisulfite or others), aversive agents such as bitterants (e.g., denatonium salts such as denatonium benzoate, denatonium saccharide, and denatonium chloride; sucrose octaacetate; quinine; flavonoids such as quercetin and naringen; and quassinoids such as quassin and brucine) and pungents (e.g., capsaicin, piperine, allyl isothiocyanate, and resinferatoxin), and other functional ingredients, in amounts suitable for their intended purposes. Embodiments including plasticizers are preferred. The amount of such agents can be up to about 50 wt. %, 20 wt %, 15 wt %, 10 wt %, 5 wt. %, 4 wt % and/or at least 0.01 wt. %, 0.1 wt %, 1 wt %, or 5 wt %, individually or collectively.

Plasticizers

A plasticizer is a liquid, solid, or semi-solid that is added to a material (usually a resin or elastomer) making that material softer, more flexible (by decreasing the glass-transition temperature of the polymer), and easier to process. A polymer can alternatively be internally plasticized by chemically modifying the polymer or monomer. In addition or in the alternative, a polymer can be externally plasticized by the addition of a suitable plasticizing agent. Water is recognized as a very efficient plasticizer for PVOH and other polymers; including but not limited to water soluble polymers, however, the volatility of water makes its utility limited since polymer films need to have at least some resistance (robustness) to a variety of ambient conditions including low and high relative humidity.

The plasticizer can include, but is not limited to, glycerin, diglycerin, sorbitol, ethylene glycol, diethylene glycol, triethylene glycol, dipropylene glycol, tetraethylene glycol, propylene glycol, polyethylene glycols up to 400 MW, neopentyl glycol, trimethylolpropane, polyether polyols, sorbitol, 2-methyl-1,3-propanediol (MPDiol®), ethanolamines, and a mixture thereof. A preferred plasticizer is glycerin, sorbitol, triethyleneglycol, propylene glycol, dipropylene glycol, 2-methyl-1,3-propanediol, trimethylolpropane, or a combination thereof. The total amount of the non-water plasticizer can be in a range of about 10 wt. % to about 40 wt. %, or about 15 wt. % to about 35 wt. %, or about 20 wt. % to about 30 wt. %, for example about 25 wt. %, based on total film weight. Combinations of glycerin, dipropylene glycol, and sorbitol can be used. Optionally, glycerin can be used in an amount of about 5 wt % to about 30 wt %, or 5 wt % to about 20 wt %, e.g., about 13 wt %. Optionally, dipropylene glycol can be used in an amount of about 1 wt. % to about 20 wt. %, or about 3 wt. % to about 10 wt. %, for example 6 wt. %. Optionally, sorbitol can be used in an amount of about 1 wt % to about 20 wt %, or about 2 wt % to about 10 wt %, e.g., about 5 wt %. The specific amounts of plasticizers can be selected in a particular embodiment based on desired film flexibility and processability features of the water-soluble film. At low plasticizer levels, films may become brittle, difficult to process, or prone to breaking. At elevated plasticizer levels, films may be too soft, weak, or difficult to process for a desired use.

In some embodiments the plasticizer can include glycerin, sorbitol, and trimethyloyl propane. Optionally, the plasticizer can be included in an amount greater than or equal to 30 phr, or greater than 40 phr, for example in a range of about 30 phr to about 75 phr, about 30 phr to about 70 phr, about 30 phr to about 60 phr, about 30 phr to about 50 phr, or about 30 phr to about 45 phr.

In some embodiments, the plasticizer can include glycerin, sorbitol, and 2-methyl-1,3-propanediol. Optionally the plasticizer can be included in an amount less than 30 phr or less than 25 phr, for example in a range of about 5 phr to about 30 phr, about 10 phr to about 30 phr, about 15 phr to about 30 phr, about 5 phr to about 29 phr, about 5 phr to about 25 phr, about 10 phr to about 25 phr, or about 15 phr to about 25 phr.

In some embodiments, the plasticizer can include a first plasticizer having a molecular weight of 92 g/mol or greater and a second plasticizer having a molecular weight of 150 g/mol or greater. For example, the first plasticizer can have a molecular weight in a range of about 92 g/mol to about 149 g/mol, about 92 g/mol to about 140 g/mol, about 92 g/mol to about 130 g/mol, about 92 g/mol to about 120 g/mol, about 92 g/mol to about 110 g/mol, or about 92 g/mol to about 100 g/mol, and the second plasticizer can have a molecular weight in a range of about 150 g/mol to 200 g/mol, for example, about 150 g/mol to about 190 g/mol, about 160 g/mol to about 190 g/mol, about 170 g/mol to about 190 g/mol, or about 180 g/mol to about 190 g/mol.

It will be understood that individual plasticizers can be characterized by Hansen Solubility Parameters that are outside a defined Hansen area, but that by blending plasticizers the resulting combination or ratio can then fall within the defined Hansen area. Accordingly, when more than one plasticizer is used for the polymer resin, the combination will be selected such that it is characterized by the Hansen Solubility Parameters described herein.

The solubility characteristics of a material can be characterized by three individual forces: dispersive forces ($\delta_D$), polar forces ($\delta_P$), and hydrogen bonding forces ($\delta_H$). The individual forces can be combined into a total cohesive energy value ($\delta_T$) as shown in Equation 1:

$$(\delta_T)^2 = (\delta_D)^2 + (\delta_P)^2 + (\delta_H)^2. \tag{1}$$

In addition to representative solubility parameters for a single component, a Hansen area can be defined in Hansen Space as a sphere with the individual solubility parameters ($\delta_D$), ($\delta_P$), and ($\delta_H$) as the center and a radius RAD defining the extent of the sphere.

In another aspect, the Hansen area definition can further include "Core" values. The core values define how much the center of the sphere (defined by $\delta_D$, $\delta_P$, $\delta_H$, and RAD) can, in a sense, move in the $\delta_D$, $\delta_P$, and $\delta_H$ directions (+ or −) to extend the Hansen area. Thus, the larger the Core values, the less tightly the Hansen area approximates a truly spherical area.

Calculations for evaluating the various HSP values can be performed using a commercially available software package such as HSPIP (available from the Hansen Solubility Parameters internet site, currently in the 4$^{th}$ edition). Experimentally good plasticizers and poor plasticizers can be tested, and the HSP coordinates $\delta_D$, $\delta_P$, and $\delta_H$ for a material can be experimentally determined. Alternatively, the individual HSP coordinates $\delta_D$, $\delta_P$, and $\delta_H$ can be computed using the Y-MB methodology (included in the HSPIP software). Regardless of the method selected for HSP parameter estimation, a consistent method is suitably used for all plasticizers and polymeric components of interest. For example, HSP parameters for common plasticizers are provided in the table below.

| Name | Plas | δD | δP | δH |
|---|---|---|---|---|
| Propylene Glycol | PG | 16.8 | 10.4 | 21.3 |
| 2 Methyl Propane Diol | 2M-1,3PD | 17.1 | 9.4 | 20.7 |
| Diethylene Glycol | DEG | 16.6 | 12 | 19 |
| Trimethylolpropane | TMP | 17.1 | 9.9 | 21.1 |

-continued

| Name | Plas | δD | δP | δH |
|---|---|---|---|---|
| diglycerin | DG | 17.4 | 11.9 | 26.6 |
| Dipropylene Glycol | DPG | 16.5 | 10.6 | 17.7 |
| Triethylene Glycol | TEG | 16 | 12.5 | 18.6 |
| Glycerol | GLY | 17.4 | 11.3 | 27.2 |
| Polyethylene Glycol 200 | PEG200 | 16.4 | 9.4 | 15.3 |

Surfactants

Surfactants for use in water-soluble films are well known in the art. Optionally, surfactants are included to aid in the dispersion of the resin solution upon casting. Suitable surfactants for water-soluble films of the present disclosure include, but are not limited to, dialkyl sulfosuccinates, lactylated fatty acid esters of glycerin and propylene glycol, lactylic esters of fatty acids, sodium alkyl sulfates, polysorbate 20, polysorbate 60, polysorbate 65, polysorbate 80, alkyl polyethylene glycol ethers, lecithin, acetylated fatty acid esters of glycerin and propylene glycol, sodium lauryl sulfate, acetylated esters of fatty acids, myristyl dimethylamine oxide, trimethyl tallow alkyl ammonium chloride, quaternary ammonium compounds, alkali metal salts of higher fatty acids containing about 8 to 24 carbon atoms, alkyl sulfates, alkyl polyethoxylate sulfates, alkylbenzene sulfonates, monoethanolamine, lauryl alcohol ethoxylate, propylene glycol, diethylene glycol, salts thereof and combinations of any of the forgoing.

Suitable surfactants can include the nonionic, cationic, anionic and zwitterionic classes. Suitable surfactants include, but are not limited to, propylene glycols, diethylene glycols, monoethanolamine, polyoxyethylenated polyoxypropylene glycols, alcohol ethoxylates, alkylphenol ethoxylates, tertiary acetylenic glycols and alkanolamides (nonionics), polyoxyethylenated amines, quaternary ammonium salts and quaternized polyoxyethylenated amines (cationics), alkali metal salts of higher fatty acids containing about 8 to 24 carbon atoms, alkyl sulfates, alkyl polyethoxylate sulfates and alkylbenzene sulfonates (anionics), and amine oxides, N-alkylbetaines and sulfobetaines (zwitterionics). Other suitable surfactants include dioctyl sodium sulfosuccinate, lactylated fatty acid esters of glycerin and propylene glycol, lactylic esters of fatty acids, sodium alkyl sulfates, polysorbate 20, polysorbate 60, polysorbate 65, polysorbate 80, lecithin, acetylated fatty acid esters of glycerin and propylene glycol, and acetylated esters of fatty acids, and combinations thereof. In various embodiments, the amount of surfactant in the water-soluble film is in a range of about 0.1 wt % to 2.5 wt %, optionally about 1.0 wt % to 2.0 wt %. In embodiments, the amount of surfactant in the water-soluble film is expressed in parts per 100 parts total water soluble polymer (phr) in the water-soluble film and is present in a range of about 0.5 phr to about 4 phr, about 0.75 phr to about 3.0 phr, about 1.0 phr to about 2.5 phr, about 1.0 phr to about 2.0 phr, or about 1.5 phr.

Surfactants can be characterized in terms of hydrophilic/lipophilic balance (HLB). Griffin's method was described in 1954 (Griffin W C: "Calculation of HLB Values of Non-Ionic Surfactants," Journal of the Society of Cosmetic Chemists 5 (1954): 259) and is used in the art for determining HLB values for non-ionic surfactants as follows: HLB=20*Mh/M, where Mh is the molecular mass of the hydrophilic portion of the molecule, and M is the molecular mass of the whole molecule, giving an HLB value on a scale of 0 to 20. An HLB value of 0 corresponds to a completely lipophilic/hydrophobic molecule and a value of 20 corresponds to a completely hydrophilic/lipophobic molecule.

Blends of surfactants have been found to be advantageous for water-soluble films comprising anionic monomers selected from the group consisting of maleic acid, maleic anhydride, monoalkyl maleates, dialkyl maleates and combinations thereof. Thus, in an aspect of the disclosure, the second PVOH copolymer comprises an anionic monomer selected from the group consisting of maleic acid, maleic anhydride, monoalkyl maleates, dialkyl maleates and combinations thereof, wherein the total level of anionic pendant groups from the first PVOH copolymer and the second PVOH copolymer is at least about 3 mol. %, at least about 3.5 mol %, at least about 4.0 mol %, at least about 6 mol. %, or at least about 8 mol. %, and the water-soluble film further comprises a non-ionic surfactant, an amine oxide surfactant, an anionic surfactant, a cationic surfactant, or a combinations thereof. In refinements of the foregoing aspect, the non-ionic surfactant is selected from the group consisting of polyoxyethylenated polyoxypropylene glycols, alcohol ethoxylates, alkylphenol ethoxylates, tertiary acetylenic glycols, alkanolamides, and combinations thereof. In refinements, the amine oxide surfactant is selected from the group consisting of dimethyloctylamine oxide, dimethyldecylamine oxide, dimethyldodecylamine oxide, dimethyltetradecylamine oxide, dimethylhexadecylamine oxide, dimethyloctadecylamine oxide and combinations of the foregoing. It will be appreciated that commercially available amine oxide surfactants may be blends of the foregoing as the source of the amines can include a distribution of amines of various chain length. Accordingly, as an example, in some embodiments a "dimethyldodecylamine oxide," can include a distribution of amine oxides wherein the average amine oxide and/or the major fraction of amine oxide comprises a dodecyl chain. In refinements, the anionic surfactant can comprise dioctyl sodium sulfosuccinate. In refinements, the cationic surfactant can be selected from the group consisting of polyoxyethylenated amines, quaternary ammonium salts, quaternized polyoxyethylenated amines, and combinations thereof. In embodiments, the total amount of combined surfactants in the water-soluble film is in a range of about 0.5 phr to about 4 phr, about 0.75 phr to about 3.0 phr, about 1.0 phr to about 2.5 phr, about 1.0 phr to about 2.0 phr, or about 1.5 phr.

In refinements of the foregoing aspect, each of the surfactants present in the water-soluble film can be present in an amount in a range of about 1 wt. % to about 98 wt. % of the total amount of surfactants, or about 10 wt. % to about 80 wt. %, or about 15 wt. % to about 70 wt. %, or about 16 wt. % to about 68 wt. %, or about 17 wt. % to about 42 wt. %, or about 30 wt. % to about 40 wt. %.

Suitable lubricants/release agents can include, but are not limited to, fatty acids and their salts, fatty alcohols, fatty esters, fatty amines, fatty amine acetates and fatty amides. Preferred lubricants/release agents are fatty acids, fatty acid salts, and fatty amine acetates. In one type of embodiment, the amount of lubricant/release agent in the water-soluble film is in a range of about 0.02 wt % to about 1.5 wt %, optionally about 0.1 wt % to about 1 wt %.

Fillers can be included in the water-soluble films and can include bulking agents, extenders, antiblocking agents, detackifying agents and combinations thereof. Suitable fillers/bulking agents/extenders/antiblocking agents/detackifying agents include, but are not limited to, starches, modified starches, crosslinked polyvinylpyrrolidone, crosslinked cellulose, microcrystalline cellulose, silica, metallic oxides, calcium carbonate, talc, mica, stearic acid and metal salts thereof, for example, magnesium stearate. Preferred materials are starches, modified starches and silica. In one type of embodiment, the amount of filler/extender/antiblocking agent/detackifying agent in the water soluble film can be in a range of about 1 wt. % to about 6 wt. %, or about 1 wt. % to about 4 wt. %, or about 2 wt. % to about 4 wt. %, or about 1 phr to about 6 phr, or about 1 phr to about 4 phr, or about 2 phr to about 4 phr, for example.

In some embodiments, the water-soluble film can include 2 or more phr (e.g., 2 phr to 6 phr or 2 phr to 4 phr) of a filler. In some embodiments, the film includes 2 or more phr (e.g., 2 phr to 6 phr or 2 phr to 4 phr) of a filler and the filler comprises a bulking agent, an antiblocking agent, or a combination thereof. Without intending to be bound by theory, it is believed that the inclusion of 2 or more phr (e.g., 2 phr to 6 phr or 2 phr to 4 phr) of a filler can be useful to prevent weeping or migration of plasticizer out of the film, when the plasticizer is included in an amount of greater than or equal to 30 phr, for example, in a range of 30 phr to 50 phr.

An anti-block agent (e.g. $SiO_2$ and/or stearic acid)) can be present in the film in an amount of at least 0.1 PHR, or at least 0.5 PHR, or at least 1 PHR, or in a range of about 0.1 to 5.0 PHR, or about 0.1 to about 3.0 PHR, or about 0.4 to 1.0 PHR, or about 0.5 to about 0.9 PHR, or about 0.5 to about 2 PHR, or about 0.5 to about 1.5 PHR, or 0.1 to 1.2 PHR, or 0.1 to 2.7 PHR, for example 0.5 PHR, 0.6 PHR, 0.7 PHR, 0.8 PHR, or 0.9 PHR.

A suitable median particle size for the anti-block agent includes a median size in a range of about 3 to about 11 microns, or about 4 microns to about 11 microns, or about 4 to about 8 microns, or about 5 to about 6 microns, for example 5, 6, 7, 8, or 9 microns. A suitable $SiO_2$ is an untreated synthetic amorphous silica designed for use in aqueous systems.

The water-soluble film can further have a residual moisture content of at least 4 wt. %, for example in a range of about 4 to about 10 wt. %, as measured by Karl Fischer titration.

To be considered a water-soluble film according to the present disclosure, the film, at a thickness of about 1.5 mil (about 0.038 mm), dissolves in 300 seconds or less in water at a temperature of 20° C. (68° F.) in accordance with MonoSol Test Method MSTM-205.

Method of Making Film

One contemplated class of embodiments is characterized by the water-soluble film being formed by solvent casting. Processes for solvent casting of PVOH are well-known in the art. For example, in the film-forming process, the polyvinyl alcohol polymers and secondary additives are dissolved in a solvent, typically water, metered onto a surface, allowed to substantially dry (or force-dried) to form a cast film, and then the resulting cast film is removed from the casting surface. The process can be performed batchwise, and is more efficiently performed in a continuous process.

In the formation of continuous films of polyvinyl alcohol, it is the conventional practice to meter a solution of the solution onto a moving casting surface, for example, a continuously moving metal drum or belt, causing the solvent to be substantially removed from the liquid, whereby a self-supporting cast film is formed, and then stripping the resulting cast film from the casting surface.

Optionally, the water-soluble film can be a free-standing film consisting of one layer or a plurality of like layers.

Pouches

The film disclosed herein is useful for creating pouches to contain a composition therein. The pouch composition may take any form such as powders, gels, pastes, liquids, tablets or any combination thereof. The film is also useful for any other application in which improved wet handling and low cold water residues are desired. The film forms at least one side wall of the pouch, optionally the entire pouch, and preferably an outer surface of the at least one sidewall.

The film described herein can also be used to make a packet with two or more compartments made of the same film or in combination with films of other polymeric materials. Additional films can, for example, be obtained by casting, blow-molding, extrusion or blown extrusion of the same or a different polymeric material, as known in the art. In one type of embodiment, the polymers, copolymers or derivatives thereof suitable for use as the additional film are selected from polyvinyl alcohols, polyvinyl pyrrolidone, polyalkylene oxides, polyacrylic acid, cellulose, cellulose ethers, cellulose esters, cellulose amides, polyvinyl acetates, polycarboxylic acids and salts, polyaminoacids or peptides, polyamides, polyacrylamide, copolymers of maleic/acrylic acids, polysaccharides including starch and gelatin, natural gums such as xanthan, and carrageenans. For example, polymers can be selected from polyacrylates and water-soluble acrylate copolymers, methylcellulose, carboxymethylcellulose sodium, dextrin, ethylcellulose, hydroxyethyl cellulose, hydroxypropyl methylcellulose, maltodextrin, polymethacrylates, and combinations thereof, or selected from polyvinyl alcohols, polyvinyl alcohol copolymers and hydroxypropyl methyl cellulose (HPMC), and combinations thereof. One contemplated class of embodiments is characterized by the level of polymer in the packet material, for example the PVOH copolymer described above, as described above, being at least 60 wt. %, and up to 99 wt. %.

The pouches of the present disclosure can include at least one sealed compartment. Thus, the pouches may comprise a single compartment or multiple compartments. A water-soluble pouch can be formed from two layers of water-soluble polymer film sealed at an interface, or by a single film that is folded upon itself and sealed. One or both of the films include the PVOH film described above. The films define an interior pouch container volume which contains any desired composition for release into an aqueous environment. The composition is not particularly limited, for example including any of the variety of compositions described below. In embodiments comprising multiple compartments, each compartment may contain identical and/or different compositions. In turn, the compositions may take any suitable form including, but not limited to liquid, solid and combinations thereof (e.g. a solid suspended in a liquid). In embodiments, the pouches comprises a first, second and third compartment, each of which respectively contains a different first, second, and third composition.

The compartments of multi-compartment pouches may be of the same or different size(s) and/or volume(s). The compartments of the present multi-compartment pouches can be separate or conjoined in any suitable manner. In embodiments, the second and/or third and/or subsequent compartments are superimposed on the first compartment. In one embodiment, the third compartment may be superimposed on the second compartment, which is in turn superimposed on the first compartment in a sandwich configuration. Alternatively the second and third compartments may be superimposed on the first compartment. However it is also equally envisaged that the first, second and optionally third and subsequent compartments may be attached to one another in a side by side relationship. The compartments may be packed in a string, each compartment being individually separable by a perforation line. Hence each compartment may be individually torn-off from the remainder of the string by the end-user, for example, so as to pre-treat or post-treat a fabric with a composition from a compartment. In embodiments, the first compartment may be surrounded by at least the second compartment, for example in a tire-and-rim configuration, or in a pouch-in-a-pouch configuration.

In embodiments, multi-compartment pouches comprise three compartments consisting of a large first compartment and two smaller compartments. The second and third smaller compartments are superimposed on the first larger compartment. The size and geometry of the compartments are chosen such that this arrangement is achievable. The geometry of the compartments may be the same or different. In embodiments the second and optionally third compartment each has a different geometry and shape as compared to the first compartment. In these embodiments, the second and optionally third compartments are arranged in a design on the first compartment. The design may be decorative, educative, or illustrative, for example to illustrate a concept or instruction, and/or used to indicate origin of the product. In embodiments, the first compartment is the largest compartment having two large faces sealed around the perimeter, and the second compartment is smaller covering less than about 75%, or less than about 50% of the surface area of one face of the first compartment. In embodiments in which there is a third compartment, the aforementioned structure may be the same but the second and third compartments cover less than about 60%, or less than about 50%, or less than about 45% of the surface area of one face of the first compartment.

The pouches of the present disclosure may comprise one or more different films. For example, in single compartment embodiments, the packet may be made from one wall that is folded onto itself and sealed at the edges, or alternatively, two walls that are sealed together at the edges. In multiple compartment embodiments, the packet may be made from one or more films such that any given packet compartment may comprise walls made from a single film or multiple films having differing compositions. In one embodiment, a multi-compartment pouch comprises at least three walls: an outer upper wall; an outer lower wall; and a partitioning wall. The outer upper wall and the outer lower wall are generally opposing and form the exterior of the pouch. The partitioning wall is interior to the pouch and is secured to the generally opposing outer walls along a seal line. The partitioning wall separates the interior of the multi-compartment pouch into at least a first compartment and a second compartment.

Pouches and packets may be made using any suitable equipment and method. For example, single compartment pouches may be made using vertical form filling, horizontal form filling, or rotary drum filling techniques commonly known in the art. Such processes may be either continuous or intermittent. The film may be dampened, and/or heated to increase the malleability thereof. The method may also involve the use of a vacuum to draw the film into a suitable mold. The vacuum drawing the film into the mold can be applied for about 0.2 to about 5 seconds, or about 0.3 to about 3, or about 0.5 to about 1.5 seconds, once the film is on the horizontal portion of the surface. This vacuum can be such that it provides an under-pressure in a range of 10 mbar to 1000 mbar, or in a range of 100 mbar to 600 mbar, for example.

The molds, in which packets may be made, can have any shape, length, width and depth, depending on the required dimensions of the pouches. The molds may also vary in size and shape from one to another, if desirable. For example, the volume of the final pouches may be about 5 ml to about 300 ml, or about 10 to 150 ml, or about 20 to about 100 ml, and that the mold sizes are adjusted accordingly.

In one embodiment, the packet comprises a first and a second sealed compartment. The second compartment is in a generally superposed relationship with the first sealed compartment such that the second sealed compartment and the first sealed compartment share a partitioning wall interior to the pouch.

In one embodiment, the packet comprising a first and a second compartment further comprises a third sealed compartment. The third sealed compartment is in a generally superposed relationship with the first sealed compartment such that the third sealed compartment and the first sealed compartment share a partitioning wall interior to the pouch.

In embodiments, the first composition and the second composition are selected from one of the following combinations: liquid, liquid; liquid, powder; powder, powder; and powder, liquid.

In some embodiments, the first, second and third compositions are selected from one of the following combinations: solid, liquid, liquid and liquid, liquid, liquid.

In one embodiment, the single compartment or plurality of sealed compartments contains a composition. The plurality of compartments may each contain the same or a different composition. The composition is selected from a liquid, solid or combination thereof.

In one embodiment, the composition may be selected from the group of liquid light duty and liquid heavy duty liquid detergent compositions, powdered detergent compositions, dish detergent for hand washing and/or machine washing; hard surface cleaning compositions, fabric enhancers, detergent gels commonly used for laundry, and bleach and laundry additives, shampoos, and body washes, agricultural compositions, automotive compositions, aviation compositions, food and nutritive compositions, industrial compositions, livestock compositions, marine compositions, medical compositions, mercantile compositions, military and quasi-military compositions, office compositions, and recreational and park compositions, pet compositions, water-treatment compositions, including cleaning and detergent compositions applicable to any such use.

Vertical Form, Fill, and Sealing

One conventional automated process includes a vertical form, fill, and seal (VFFS) process. VFFS includes an apparatus such as an assembly machine that wraps a single piece of the film around a vertically oriented feed tube. The machine heat seals or otherwise secures the opposing edges of the film together to create the side seal and form a hollow tube of film. Subsequently, the machine heat seals or otherwise creates the bottom seal, thereby defining a container portion with an open top where the top seal will later be formed. The machine introduces a specified amount of flowable product into the container portion through the open top end. Once the container includes the desired amount of product, the machine advances the film to another heat sealing device, for example, to create the top seal. Finally, the machine advances the film to a cutter that cuts the film immediately above the top seal to provide a filled package.

During operation, the assembly machine advances the film from a roll to form the package. Accordingly, the film must be able to readily advance through the machine and not adhere to the machine assembly or be so brittle as to break during processing.

Shaping, Sealing, and Thermoforming

A thermoformable film is one that can be shaped through the application of heat and a force. In general, the films of the disclosure are thermoformable.

As is known in the art, thermoforming a film is the process of heating the film, shaping it (e.g. in a mold), and then allowing the film to cool, whereupon the film will hold its shape, e.g. the shape of the mold. The heat may be applied using any suitable means. For example, the film may be heated directly by passing it under a heating element or through hot air, prior to feeding it onto a surface or once on a surface. Alternatively, it may be heated indirectly, for example by heating the surface or applying a hot item onto the film. In embodiments, the film is heated using an infrared light. The film may be heated to a temperature in a range of about 50 to about 150° C., about 50 to about 120° C., about 60 to about 130° C., about 70 to about 120° C., or about 60 to about 90° C. Thermoforming can be performed by any one or more of the following processes: the manual draping of a thermally softened film over a mold, or the pressure induced shaping of a softened film to a mold (e.g., vacuum forming), or the automatic high-speed indexing of a freshly extruded sheet having an accurately known temperature into a forming and trimming station, or the automatic placement, plug and/or pneumatic stretching and pressuring forming of a film.

Alternatively, the film can be wetted by any suitable means, for example directly by spraying a wetting agent (including water, a solution of the film composition, a plasticizer for the film composition, or any combination of the foregoing) onto the film, prior to feeding it onto the surface or once on the surface, or indirectly by wetting the surface or by applying a wet item onto the film.

Once a film has been heated and/or wetted, it may be drawn into an appropriate mold, preferably using a vacuum. The filling of the molded film can be accomplished by utilizing any suitable means. In embodiments, the most preferred method will depend on the product form and required speed of filling. In embodiments, the molded film is filled by in-line filling techniques. The filled, open packets are then closed forming the pouches, using a second film, by any suitable method. This may be accomplished while in horizontal position and in continuous, constant motion. The closing may be accomplished by continuously feeding a second film, preferably water-soluble film, over and onto the open packets and then preferably sealing the first and second film together, typically in the area between the molds and thus between the packets.

Any suitable method of sealing the packet and/or the individual compartments thereof may be utilized. Non-limiting examples of such means include heat sealing, solvent welding, solvent or wet sealing, and combinations thereof. Typically, only the area which is to form the seal is treated with heat or solvent. The heat or solvent can be applied by any method, typically on the closing material, and typically only on the areas which are to form the seal. If solvent or wet sealing or welding is used, it may be preferred that heat is also applied. Preferred wet or solvent sealing/welding methods include selectively applying solvent onto the area between the molds, or on the closing material, by for example, spraying or printing this onto these areas, and then applying pressure onto these areas, to form the seal. Sealing rolls and belts as described above (optionally also providing heat) can be used, for example.

The formed pouches may then be cut by a cutting device. Cutting can be accomplished using any suitable method. It may be preferred that the cutting is also done in continuous manner, and preferably with constant speed and preferably while in horizontal position. The cutting device can, for example, be a sharp item, or a hot item, or a laser, whereby in the latter cases, the hot item or laser 'burns' through the film/sealing area.

The different compartments of a multi-compartment pouches may be made together in a side-by-side style wherein the resulting, cojoined pouches may or may not be separated by cutting. Alternatively, the compartments can be made separately.

In embodiments, pouches may be made according to a process comprising the steps of: a) forming a first compartment (as described above); b) forming a recess within or all of the closed compartment formed in step (a), to generate a second molded compartment superposed above the first compartment; c) filling and closing the second compartments by means of a third film; d) sealing the first, second and third films; and e) cutting the films to produce a multi-compartment pouch. The recess formed in step (b) may be achieved by applying a vacuum to the compartment prepared in step (a).

In embodiments, second, and/or third compartment(s) can be made in a separate step and then combined with the first compartment as described in U.S. Patent Application Publication No. 2014/345064 A1 or U.S. Patent Application Publication No. 2009/312220 A1.

In embodiments, pouches may be made according to a process comprising the steps of: a) forming a first compartment, optionally using heat and/or vacuum, using a first film on a first forming machine; b) filling the first compartment with a first composition; c) on a second forming machine, deforming a second film, optionally using heat and vacuum, to make a second and optionally third molded compartment; d) filling the second and optionally third compartments; e) sealing the second and optionally third compartment using a third film; f) placing the sealed second and optionally third compartments onto the first compartment; g) sealing the first, second and optionally third compartments; and h) cutting the films to produce a multi-compartment pouch.

The first and second forming machines may be selected based on their suitability to perform the above process. In embodiments, the first forming machine is preferably a horizontal forming machine, and the second forming machine is preferably a rotary drum forming machine, preferably located above the first forming machine.

It should be understood that by the use of appropriate feed stations, it may be possible to manufacture multi-compartment pouches incorporating a number of different or distinctive compositions and/or different or distinctive liquid, gel or paste compositions.

In embodiments, the film and/or pouch is sprayed or dusted with a suitable material, such as an active agent, a lubricant, an aversive agent, or mixtures thereof. In embodiments, the film and/or pouch is printed upon, for example, with an ink and/or an active agent.

Pouch Contents

The present articles (e.g., in the form of pouches or packets) may contain various compositions, for example household care compositions. A multi-compartment pouch may contain the same or different compositions in each separate compartment. The composition is proximal to the water-soluble film. The composition may be less than about 10 cm, or less than about 5 cm, or less than about 1 cm from the film. Typically the composition is adjacent to the film or in contact with the film. The film may be in the form of a pouch or a compartment, containing the composition therein.

This feature of the disclosure may be utilized to keep compositions containing incompatible ingredients (e.g., bleach and enzymes) physically separated or partitioned from each other. It is believed that such partitioning may expand the useful life and/or decrease physical instability of such ingredients. Additionally or alternatively, such partitioning may provide aesthetic benefits as described in U.S. Pat. No. 8,835,372.

A fabric or household care composition includes fabric treatments, hard surfaces, air care, car care, dishwashing, fabric conditioning and softening, laundry detergency, laundry and rinse additive and/or care, hard surface cleaning and/or treatment, and other cleaning for consumer or institutional use. Non-household care compositions are for other uses.

Non-limiting examples of useful compositions (e.g., household care compositions) include light duty and heavy duty liquid detergent compositions, hard surface cleaning compositions, detergent gels commonly used for laundry, bleach and laundry additives, fabric enhancer compositions (such as fabric softeners), shampoos, body washes, and other personal care compositions. Compositions of use in the present pouches may take the form of a liquid, solid or a powder. Liquid compositions may comprise a solid. Solids may include powder or agglomerates, such as micro-capsules, beads, noodles or one or more pearlized balls or mixtures thereof. Such a solid element may provide a technical benefit, through the wash or as a pre-treat, delayed or sequential release component; additionally or alternatively, it may provide an aesthetic effect.

Non-limiting examples of other useful compositions (e.g., non-household care compositions) include agricultural compositions, aviation compositions, food and nutritive compositions, industrial compositions, livestock compositions, marine compositions, medical compositions, mercantile compositions, military and quasi-military compositions, office compositions, and recreational and park compositions, pet compositions, water-treatment compositions, including cleaning and detergent compositions applicable to any such use while excluding fabric and household care compositions. Compositions of use in the present pouches may take the form of a liquid, solid or a powder. Liquid compositions may comprise a solid. Solids may include powder or agglomerates, such as micro-capsules, beads, noodles or one or more pearlized balls or mixtures thereof. Such a solid element may provide a technical benefit, through the wash or as a pre-treat, delayed or sequential release component; additionally or alternatively, it may provide an aesthetic effect.

The compositions encapsulated by the films described herein can have any suitable viscosity depending on factors such as formulated ingredients and purpose of the composition. In one embodiment, the composition has a high shear viscosity value, at a shear rate of 20 $s^{-1}$ and a temperature of 20° C., of 100 to 3,000 cP, alternatively 300 to 2,000 cP, alternatively 500 to 1,000 cP, and a low shear viscosity value, at a shear rate of 1 $s^{-1}$ and a temperature of 20° C., of 500 to 100,000 cP, alternatively 1000 to 10,000 cP, alternatively 1,300 to 5,000 cP. Methods to measure viscosity are known in the art. According to the present disclosure, shear viscosity measurements of compositions other than PVOH polymer solutions are carried out using a rotational rheometer e.g. TA instruments AR550. The instrument includes a 40 mm 2° or 10 cone fixture with a gap of around 50-60 µm for isotropic liquids, or a 40 mm flat steel plate with a gap of 1000 µm for particles containing liquids. The measurement is carried out using a flow procedure that contains a conditioning step, a peak hold and a continuous ramp step. The conditioning step involves the setting of the measurement temperature at 20° C., a pre-shear of 10 seconds at a shear rate of 10 $s^{-1}$, and an equilibration of 60 seconds at the selected temperature. The peak hold involves applying a shear rate of 0.05 $s^{-1}$ at 20° C. for 3 min with sampling every 10 s. The continuous ramp step is performed at a shear rate from 0.1 to 1200 $s^{-1}$ for 3 min at 20° C. to obtain the full flow profile.

As described above, the composition may be a non-household care composition. For example, a non-household care composition can be selected from agricultural compositions, aviation compositions, food and nutritive compositions, industrial compositions, livestock compositions, marine compositions, medical compositions, mercantile compositions, military and quasi-military compositions, office compositions, and recreational and park compositions, pet compositions, water-treatment compositions, including cleaning and detergent compositions applicable to any such use while excluding fabric and household care compositions In one type of embodiment, the composition can include an agrochemical, e.g. one or more insecticides, fungicides, herbicides, pesticides, miticides, repellants, attractants, defoliaments, plant growth regulators, fertilizers, bactericides, micronutrients, and trace elements. Suitable agrochemicals and secondary agents are described in U.S. Pat. Nos. 6,204,223 and 4,681,228 and EP 0989803 A1. For example, suitable herbicides include paraquat salts (for example paraquat dichloride or paraquat bis(methylsulphate), diquat salts (for example diquat dibromide or diquat alginate), and glyphosate or a salt or ester thereof (such as glyphosate isopropylammonium, glyphosate sesquisodium or glyphosate trimesium, also known as sulfosate). Incompatible pairs of crop protection chemicals can be used in separate chambers, for example as described in U.S. Pat. No. 5,558,228. Incompatible pairs of crop protection chemicals that can be used include, for example, bensulfuron methyl and molinate; 2,4-D and thifensulfuron methyl; 2,4-D and methyl 2-[[[[N-4-methoxy-6-methyl-1,3,5-triazine-2-yl)-N-methylamino]carbonyl]amino]-sulfonyl]benzoate; 2,4-D and metsulfuron methyl; maneb or mancozeb and benomyl; glyphosate and metsulfuron methyl; tralomethrin and any organophosphate such as monocrotophos or dimethoate; bromoxynil and N-[[4,6-dimethoxypyrimidine-2-yl)-amino] carbonyl]-3-(ethylsulfonyl)-2-pyridine-sulfonamide; bromoxynil and methyl 2-[[[[(4-methyl-6-methoxy)-1,3,5-triazin-2-yl)amino]carbonyl]amino]sulfonyl]-benzoate; bromoxynil and methyl 2-[[[[N-(4-methoxy-6-methyl-1,3,5-triazin-2-yl)-N-methylamino]carbonyl]amino]-sulfonyl] benzoate. In another, related, type of embodiment, the composition can include one or more seeds, optionally together with soil, and further optionally together with one or more additional components selected from mulch, sand, peat moss, water jelly crystals, and fertilizers, e.g. including types of embodiments described in U.S. Pat. No. 8,333,033.

In another type of embodiment, the composition is a water-treatment agent. Such agents include aggressive oxidizing chemicals, e.g. as described in U.S. Patent Application Publication No. 2014/0110301 and U.S. Pat. No. 8,728, 593. For example, sanitizing agents can include hypochlorite salts such as sodium hypochlorite, calcium hypochlorite, and lithium hypochlorite; chlorinated isocyanurates such as dichloroisocyanuric acid (also referred to as "dichlor" or dichloro-s-triazinetrione, 1,3-dichloro-1,3,5-triazinane-2,4, 6-trione) and trichloroisocyanuric acid (also referred to as "trichlor" or 1,3,5-trichloro-1,3,5-triazinane-2,4,6-trione). Salts and hydrates of the sanitizing compounds are also contemplated. For example, dichloroisocyanuric acid may be provided as sodium dichloroisocyanurate, sodium dichloroisocyanurate acid dihydrate, among others. Bromine containing sanitizing agents may also be suitable for use in unit dose packaging applications, such as 1,3-dibromo-5,5-dimethylhydantoin (DBDMH), 2,2-dibromo-3-nitrilopropionamide (DBNPA), dibromocyano acetic acid amide, 1-bromo-3-chloro-5,5-dimethylhydantoin; and 2-bromo-2-nitro-1,3-propanediol, among others. The oxidizing agent can be one described in U.S. Pat. No. 7,476,325, e.g. potassium hydrogen peroxymonosulfate. The composition can be a pH-adjusting chemical, e.g. as described in U.S. Patent Application Publication No. 2008/0185347, and can include, for example, an acidic component and an alkaline component such that the composition is effervescent when contacted with water, and adjusts the water pH. Suitable ingredients include sodium bicarbonate, sodium bisulfate, potassium hydroxide, sulfamic acid, organic carboxylic acids, sulfonic acids, and potassium dihydrogen phosphate. A buffer blend can include boric acid, sodium carbonate, glycolic acid, and oxone monopersulfate, for example.

A water-treatment agent can be or can include a flocculant, e.g. as described in U.S. Patent Application Publication No. 2014/0124454. The flocculant can include a polymer flocculant, e.g. polyacrylamide, a polyacrylamide copolymer such as an acrylamide copolymers of diallydimethylammonium chloride (DADMAC), dimethylaminoethylacrylate (DMAEA), dimethylaminoethylmethacrylate (DMAEM), 3-methylamidepropyltrimethylammonium chloride (MAPTAC) or acrylic acid; a cationic polyacrylamide; an anionic polyacrylamide; a neutral polyacrylamide; a polyamine; polyvinylamine; polyethylene imine; polydimethyldiallylammonium chloride; poly oxyethylene; polyvinyl alcohol; polyvinyl pyrrolidone; polyacrylic acid; polyphosphoric acid; polystyrene sulfonic acid; or any combination thereof. A flocculant can be selected from chitosan acetate, chitosan lactate, chitosan adipate, chitosan glutamate, chitosan succinate, chitosan malate, chitosan citrate, chitosan fumarate, chitosan hydrochloride, and combinations thereof. The water-treating composition can include a phosphate removing substance, e.g. one or more selected from a zirconium compound, a rare earth lanthanide salt, an aluminum compound, an iron compound, or any combination thereof.

The composition can be a limescale removing composition, e.g. citric or maleic acid or a sulphate salt thereof, or any mixture thereof, e.g. as described in U.S. Patent Application No. 2006/0172910.

Various other types of compositions are contemplated for use in the packets described herein, including particulates, for example down feathers, e.g. as described in U.S. RE29059 E; super absorbent polymers, e.g. as described in U.S. Patent Application Publication Nos. 2004/0144682 and 2006/0173430; pigments and tinters, e.g. as described in U.S. Pat. No. 3,580,390 and U.S. Patent Application Publication No. 2011/0054111; brazing flux (e.g. alkali metal fluoroaluminates, alkali metal fluorosilicates and alkali metal fluorozincates), e.g. as described in U.S. Pat. No. 8,163,104; food items (e.g., coffee powder or dried soup) as described in U.S. Patent Application Publication No. 2007/0003719; and wound dressings, e.g. as described in U.S. Pat. No. 4,466,431.

In pouches comprising laundry, laundry additive and/or fabric enhancer compositions, the compositions may comprise one or more of the following non-limiting list of ingredients: fabric care benefit agent; detersive enzyme; deposition aid; rheology modifier; builder; bleach; bleaching agent; bleach precursor; bleach booster; bleach catalyst; perfume and/or perfume microcapsules (see for example U.S. Pat. No. 5,137,646); perfume loaded zeolite; starch encapsulated accord; polyglycerin esters; whitening agent; pearlescent agent; enzyme stabilizing systems; scavenging agents including fixing agents for anionic dyes, complexing agents for anionic surfactants, and mixtures thereof; optical brighteners or fluorescers; polymer including but not limited to soil release polymer and/or soil suspension polymer; dispersants; antifoam agents; non-aqueous solvent; fatty acid; suds suppressors, e.g., silicone suds suppressors (see: U.S. Publication No. 2003/0060390 A1, 65-77); cationic starches (see: U.S. 2004/0204337 A1 and US 2007/0219111 A1); scum dispersants (see: U.S. 2003/0126282 A1, 189-90); substantive dyes; hueing dyes (see: U.S. 2014/0162929 A1); colorants; opacifier; antioxidant; hydrotropes such as toluenesulfonates, cumenesulfonates and naphthalenesulfonates; color speckles; colored beads, spheres or extrudates; clay softening agents; anti-bacterial agents. Any one or more of these ingredients is further described in described in US Patent Application Publication Number U.S. 2010/0305020 A1, U.S. Publication Number 2003/0139312A1 and U.S. Patent Application Publication Number U.S. 2011/0023240 A1. Additionally or alternatively, the compositions may comprise surfactants, quaternary ammonium compounds, and/or solvent systems. Quaternary ammonium compounds may be present in fabric enhancer compositions, such as fabric softeners, and comprise quaternary ammonium cations that are positively charged polyatomic ions of the structure $NR_4^+$, where R is an alkyl group or an aryl group.

Surfactants

The detergent compositions can comprise from about 1% to 80% by weight of a surfactant. Surfactant is particularly preferred as a component of the first composition. Preferably, the first composition comprises from about 5% to 50% by weight of surfactant. The second and third compositions may comprise surfactant at levels of from 0.1 to 99.9%.

Detersive surfactants utilized can be of the anionic, nonionic, zwitterionic, ampholytic or cationic type or can comprise compatible mixtures of these types. More preferably surfactants are selected from the group consisting of anionic, nonionic, cationic surfactants and mixtures thereof. Preferably the compositions are substantially free of betaine surfactants. Detergent surfactants useful herein are described in U.S. Pat. Nos. 3,664,961; 3,919,678; 4,222,905; and 4,239,659. Anionic and nonionic surfactants are preferred.

Useful anionic surfactants can themselves be of several different types. For example, water-soluble salts of the higher fatty acids, i.e., "soaps", are useful anionic surfactants in the compositions herein. This includes alkali metal soaps such as the sodium, potassium, ammonium, and alkyl ammonium salts of higher fatty acids containing from about 8 to about 24 carbon atoms, and preferably from about 12 to about 18 carbon atoms. Soaps can be made by direct saponification of fats and oils or by the neutralization of free fatty acids. Particularly useful are the sodium and potassium salts of the mixtures of fatty acids derived from coconut oil and tallow, i.e., sodium or potassium tallow and coconut soap.

Additional non-soap anionic surfactants which are suitable for use herein include the water-soluble salts, preferably the alkali metal, and ammonium salts, of organic sulfuric reaction products having in their molecular structure an alkyl group containing from about 10 to about 20 carbon atoms and a sulfonic acid or sulfuric acid ester group.

(Included in the term "alkyl" is the alkyl portion of acyl groups.) Examples of this group of synthetic surfactants include: a) the sodium, potassium and ammonium alkyl sulfates, especially those obtained by sulfating the higher alcohols ($C_8$-$C_{18}$) such as those produced by reducing the glycerides of tallow or coconut oil; b) the sodium, potassium and ammonium alkyl polyethoxylate sulfates, particularly those in which the alkyl group contains from 10 to 22, preferably from 12 to 18 carbon atoms, and wherein the polyethoxylate chain contains from 1 to 15, preferably 1 to 6 ethoxylate moieties; and c) the sodium and potassium alkylbenzene sulfonates in which the alkyl group contains from about 9 to about 15 carbon atoms, in straight chain or branched chain configuration, e.g., those of the type described in U.S. Pat. Nos. 2,220,099 and 2,477,383. Especially valuable are linear straight chain alkylbenzene sulfonates in which the average number of carbon atoms in the alkyl group is from about 11 to 13, abbreviated as $C_{11}$-$C_{13}$ LAS.

Preferred nonionic surfactants are those of the formula $R_1(OC_2H_4)_nOH$, wherein $R_1$ is a $C_{10}$-$C_{16}$ alkyl group or a $C_8$-$C_{12}$ alkyl phenyl group, and n is from 3 to about 80. Particularly preferred are condensation products of $C_{12}$-$C_{15}$ alcohols with from about 5 to about 20 moles of ethylene oxide per mole of alcohol, e.g., $C_{12}$-$C_{13}$ alcohol condensed with about 6.5 moles of ethylene oxide per mole of alcohol.

Solvent System

The solvent system in the detergent compositions can be a solvent system containing water alone or mixtures of organic solvents with water. Preferred organic solvents include 1,2-propanediol, ethanol, glycerin, dipropylene glycol, methyl propane diol and mixtures thereof. Other lower alcohols, low molecular weight polyols, $C_1$-$C_4$ alkanolamines such as monoethanolamine and triethanolamine, can also be used. As used herein a "low molecular weight polyol" is a molecule with more than two hydroxyl groups that has a molecular weight in a range of 50 g/mol and 1000 g/mol, 50 g/mol to 800 g/mol, or 50 g/mol to 600 g/mol. Solvent systems can be absent, for example from anhydrous solid detergent embodiments of the disclosure, but more typically are present at levels in the range of from about 0.1% to about 98%, preferably at least about 1% to about 50%, more usually from about 5% to about 25% by weight. Typically, the present detergent compositions, particularly when in liquid form, comprise less than 50% water, preferably from about 0.1% to about 20% water, or more preferably from about 0.5% to about 15%, or from about 3% to about 12%, by weight of the composition, of water. Typically, the present detergent compositions, particularly when in liquid form, comprise from about 5% to about 20% or from about 10% to about 15% glycerin, by weight of the composition. Typically, the present detergent compositions, particularly when in liquid form, comprise less than 30% propylene glycol, for example, from about 0.1% to 25% propylene glycol, 0.5% to 20% propylene glycol, or 5% to 15% propylene glycol, by weight of the composition.

The detergent compositions herein can generally be prepared by mixing the ingredients together. If a pearlescent material is used it should be added in the late stages of mixing. If a rheology modifier is used, it is preferred to first form a pre-mix within which the rheology modifier is dispersed in a portion of the water and optionally other ingredients eventually used to comprise the detergent compositions. This pre-mix is formed in such a way that it forms a structured liquid. To this structured pre-mix can then be added, while the pre-mix is under agitation, the surfactant(s) and essential laundry adjunct materials, along with water and whatever optional detergent composition adjuncts are to be used.

The pH of the detergent compositions may be from about 2 to about 12, about 4 to about 12, about 5.5 to about 9.5, about 6 to about 8.5, or about 6.5 to about 8.2. Laundry detergent compositions may have a pH of about 6 to about 10, about 6.5 to about 8.5, about 7 to about 7.5, or about 8 to about 10. Auto-dishwashing compositions may have a pH of about 8 to about 12. Laundry detergent additive compositions may have a pH of about 4 to about 8. Fabric enhancers may have a pH of from about 2 or 4 to about 8, or from about 2 to about 4, or from about 2.5 to about 3.5, or from about 2.7 to about 3.3.

The pH of the detergent is defined as the pH of an aqueous 10% (weight/volume) solution of the detergent at 20° C.±2° C.; for solids and powdered detergent this is defined as the pH of an aqueous 1% (weight/volume) solution of the detergent at 20° C.±2° C. Any meter capable of measuring pH to ±0.01 pH units is suitable. Orion meters (Thermo Scientific, Clintinpark-Keppekouter, Ninovesteenweg 198, 9320 Erembodegem-Aalst, Belgium) or equivalent are acceptable instruments. The pH meter should be equipped with a suitable glass electrode with calomel or silver/silver chloride reference. An example includes Mettler DB 115. The electrode shall be stored in the manufacturer's recommended electrolyte solution.

The 10% aqueous solution of the detergent is prepared according to the following procedure. A sample of 10±0.05 grams is weighted with a balance capable of accurately measuring to ±0.02 grams. The sample is transferred to a 100 mL volumetric flask, diluted to volume with purified water (deionized and/or distilled water are suitable as long as the conductivity of the water is <5 μS/cm), and thoroughly mixed. About 50 mL of the resulting solution is poured into a beaker, the temperature is adjusted to 20° C.±2° C. and the pH is measured according to the standard procedure of the pH meter manufacturer (it is critical to follow the manufacturer's instructions to also set up and calibrate the pH assembly).

For solid and powdered detergents, the 1% aqueous solution of the detergent is prepared according to the following procedure. A sample of 10±0.05 grams is weighted with a balance capable of accurately measuring to ±0.02 grams. The sample is transferred to a volumetric flask of 1000 mL, diluted to volume with purified water (deionized and/or distilled water are suitable as long as the conductivity of the water is <5 μS/cm), and thoroughly mixed. About 50 mL of the resulting solution is poured into a beaker, the temperature is adjusted to 20° C.±2° C. and the pH is measured according to the standard procedure of the pH meter manufacturer (it is critical to follow the manufacturer's instructions to also set up and calibrate the pH assembly).

It is known in the art that, when formed into a pouch enclosing a composition, some film components (e.g., plasticizers) can, in some circumstances, migrate from the film into the enclosed composition and, additionally or alternatively, some components of the enclosed composition (e.g., plasticizer, solvent) can migrate into the film. Without intending to be bound by theory, it is believed that this migration of components into/out of the film can result in changes to the films swelling value.

Bleaches

Inorganic and organic bleaches are suitable cleaning actives for use herein. Inorganic bleaches include perhydrate salts such as perborate, percarbonate, perphosphate, persulfate and persilicate salts. The inorganic perhydrate salts are normally the alkali metal salts. The inorganic perhydrate salt may be included as the crystalline solid without additional protection. Alternatively, the salt can be coated as is known in the art.

Alkali metal percarbonates, particularly sodium percarbonate are preferred perhydrates for use in the detergent composition described herein. The percarbonate is most preferably incorporated into the products in a coated form and/or encapsulated which provides in-product stability. A suitable coating material providing in product stability comprises mixed salt of a water-soluble alkali metal sulphate and carbonate. Such coatings together with coating processes have previously been described in GB 1,466,799, and U.S. Pat. Nos. 3,975,280; 4,075,116; and 5,340,496, each incorporated herein by reference. The weight ratio of the mixed salt coating material to percarbonate lies in the range from 1:99 to 1:9, and preferably from 1:49 to 1:19. Preferably, the mixed salt is of sodium sulphate and sodium carbonate which has the general formula $Na_2SO_4+n+Na_2CO_3$ wherein n is from 0.1 to 3, preferably from 0.3 to 1.0, and more preferably from 0.2 to 0.5. Another suitable coating material providing in product stability comprises sodium silicate of $SiO_2$: $Na_2O$ ratio from 1.8:1 to 3.0:1, preferably 1.8:1 to 2.4:1, and/or sodium metasilicate, preferably applied at a level of from 2% to 10%, (normally from 3% to 5%) of $SiO_2$ by weight of the inorganic perhydrate salt, such as potassium peroxymonopersulfate. Other coatings which contain magnesium silicate, silicate and borate salts, silicate and boric acids, waxes, oils, and fatty soaps can also be used advantageously Organic bleaches can include organic peroxyacids including diacyl and tetraacylperoxides, especially diperoxydodecanedioc acid, diperoxytetradecanedioc acid, and diperoxyhexadecanedioc acid. Dibenzoyl peroxide is a preferred organic peroxyacid herein. The diacyl peroxide, especially dibenzoyl peroxide, preferably can be present in the form of particles having a weight average diameter of from about 0.1 to about 100 microns, preferably from about 0.5 to about 30 microns, more preferably from about 1 to about 10 microns. Preferably, at least about 25% to 100%, more preferably at least about 50%, even more preferably at least about 75%, most preferably at least about 90%, of the particles are smaller than 10 microns, preferably smaller than 6 microns.

Other organic bleaches include the peroxy acids, particular examples being the alkylperoxy acids and the arylperoxy acids. Preferred representatives are: (a) peroxybenzoic acid and its ring-substituted derivatives, such as alkylperoxybenzoic acids, but also peroxy-α-naphthoic acid and magnesium monoperphthalate; (b) the aliphatic or substituted aliphatic peroxy acids, such as peroxylauric acid, peroxystearic acid, ε-phthalimidoperoxycaproic acid[phthaloiminoperoxyhexanoic acid (PAP)], o-carboxybenzamidoperoxycaproic acid, N-nonenylamidoperadipic acid and N-nonenylamidopersuccinates; and (c) aliphatic and araliphatic peroxydicarboxylic acids, such as 1,12-diperoxycarboxylic acid, 1,9-diperoxyazelaic acid, diperoxysebacic acid, diperoxybrassylic acid, the diperoxyphthalic acids, 2-decyldiperoxybutane-1,4-dioic acid, N,N-terephthaloyldi(6-aminopercaproic acid)

Bleach activators can include organic peracid precursors that enhance the bleaching action in the course of cleaning at temperatures of 60° C. and below. Bleach activators suitable for use herein include compounds which, under perhydrolysis conditions, give aliphatic peroxoycarboxylic acids having preferably from 1 to 10 carbon atoms, in particular from 2 to 4 carbon atoms, and/or optionally substituted perbenzoic acid. Suitable substances bear O-acyl and/or N-acyl groups of the number of carbon atoms specified and/or optionally substituted benzoyl groups. Preference is given to polyacylated alkylenediamines, in particular tetraacetylethylenediamine (TAED), acylated triazine derivatives, in particular 1,5-diacetyl-2,4-dioxohexahydro-1,3,5-triazine (DADHT), acylated glycolurils, in particular tetraacetylglycoluril (TAGU), N-acylimides, in particular N-nonanoylsuccinimide (NOSI), acylated phenolsulfonates, in particular n-nonanoyl- or isononanoyloxybenzenesulfonate (n- or iso-NOBS), carboxylic anhydrides, in particular phthalic anhydride, acylated polyhydric alcohols, in particular triacetin, ethylene glycol diacetate and 2,5-diacetoxy-2,5-dihydrofuran and also triethylacetyl citrate (TEAC).

Bleach catalysts preferred for use in the detergent composition herein include the manganese triazacyclononane and related complexes (U.S. Pat. Nos. 4,246,612 and 5,227,084); Co, Cu, Mn and Fe bispyridylamine and related complexes (U.S. Pat. No. 5,114,611); and pentamine acetate cobalt(III) and related complexes (U.S. Pat. No. 4,810,410). A complete description of bleach catalysts suitable for use herein can be found in U.S. Pat. No. 6,599,871, incorporated herein by reference.

Dishwashing Agents

A preferred surfactant for use in automatic dishwashing detergents is low foaming by itself or in combination with other components (e.g. suds suppressers). Preferred for use herein are low and high cloud point nonionic surfactants and mixtures thereof including nonionic alkoxylated surfactants (especially ethoxylates derived from $C_6$-$C_{18}$ primary alcohols), ethoxylated-propoxylated alcohols (e.g., Olin Corporation's POLY-TERGENT® SLF18), epoxy-capped poly (oxyalkylated) alcohols (e.g., Olin Corporation's POLY-TERGENT® SLF18B—see WO-A-94/22800), ether-capped poly(oxyalkylated) alcohol surfactants, and block polyoxyethylene-polyoxypropylene polymeric compounds such as PLURONIC®, REVERSED PLURONIC®, and TETRONIC® by the BASF-Wyandotte Corp., Wyandotte, Mich.; amphoteric surfactants such as the $C_{12}$-$C_{20}$ alkyl amine oxides (preferred amine oxides for use herein include lauryldimethyl amine oxide and hexadecyl dimethyl amine oxide), and alkyl amphocarboxylic surfactants such as MIRANOL™ C2M; and zwitterionic surfactants such as the betaines and sultaines; and mixtures thereof. Surfactants suitable for use herein are disclosed, for example, in U.S. Pat. Nos. 3,929,678 and 4,259,217, and EP Patent Publication 0414 549A1, and PCT patent application publications WO 1994/007974 A1 and WO 1994/007986 A1. Surfactants can be present in the detergent at a level of from about 0.2% to about 30% by weight, more preferably from about 0.5% to about 10% by weight, most preferably from about 1% to about 5% by weight of a detergent composition.

Other Compositions and Additives

Builders suitable for use in the detergent composition described herein include water-soluble builders, including citrates, carbonates, silicate and polyphosphates, e.g. sodium tripolyphosphate and sodium tripolyphosphate hexahydrate, potassium tripolyphosphate and mixed sodium and potassium tripolyphosphate salts.

Enzymes suitable for use in the detergent composition described herein include bacterial and fungal cellulases including CAREZYME and CELLUZYME (Novo Nordisk A/S); peroxidases; lipases including AMANO-P (Amano Pharmaceutical Co.), M1 LIPASE and LIPOMAX (Gist-Brocades) and LIPOLASE and LIPOLASE ULTRA (Novo); cutinases; proteases including ESPERASE, ALCALASE, DURAZYM and SAVINASE (Novo) and MAXATASE, MAXACAL, PROPERASE and MAXAPEM (Gist-Brocades); α and β amylases including PURAFECT OX AM (Genencor) and TERMAMYL, BAN, FUNGAMYL, DURAMYL, and NATALASE (Novo); pectinases; and mixtures thereof. Enzymes can be added herein as prills, granulates, or cogranulates at levels typically in the range from about 0.0001% to about 2% pure enzyme by weight of the cleaning composition.

Suds suppressors suitable for use in the detergent composition described herein include nonionic surfactants having a low cloud point. "Cloud point" as used herein, is a well-known property of nonionic surfactants which is the result of the surfactant becoming less soluble with increasing temperature, the temperature at which the appearance of a second phase is observable is referred to as the "cloud point." As used herein, a "low cloud point" nonionic surfactant is defined as a nonionic surfactant system ingredient having a cloud point of less than 30° C., preferably less than about 20° C., and even more preferably less than about 10° C., and most preferably less than about 7.5° C. Low cloud point nonionic surfactants can include nonionic alkoxylated surfactants, especially ethoxylates derived from primary alcohol, and polyoxypropylene/polyoxyethylene/polyoxypropylene (PO/EO/PO) reverse block polymers. Also, such low cloud point nonionic surfactants can include, for example, ethoxylated-propoxylated alcohol (e.g., BASF POLY-TERGENT SLF18) and epoxy-capped poly(oxyalkylated) alcohols (e.g., BASF POLY-TERGENT SLF18B series of nonionics, as described, for example, in U.S. Pat. No. 5,576,281).

Other suitable components for use in the detergent composition described herein include cleaning polymers having anti-redeposition, soil release or other detergency properties. Anti-redeposition polymers for use herein include acrylic acid containing polymers such as SOKALAN PA30, PA20, PA15, PA10 and SOKALAN CP10 (BASF GmbH), ACUSOL 45N, 480N, 460N (Rohm and Haas), acrylic acid/maleic acid copolymers such as SOKALAN CP5 and acrylic/methacrylic copolymers. Other suitable polymers include amine-based polymers such as alkoxylated polyalkyleneimines (e.g., PEI600 EO20 and/or ethoxysulfated hexamethylene diamine dimethyl quats). Soil release polymers for use herein include alkyl and hydroxyalkyl celluloses (U.S. Pat. No. 4,000,093), polyoxyethylenes, polyoxypropylenes and copolymers thereof, and nonionic and anionic polymers based on terephthalate esters of ethylene glycol, propylene glycol and mixtures thereof.

Heavy metal sequestrants and crystal growth inhibitors are also suitable for use in the detergent, for example diethylenetriamine penta(methylene phosphonate), ethylenediamine tetra(methylene phosphonate) hexamethylenediamine tetra(methylene phosphonate), ethylene diphosphonate, hydroxy-ethylene-1,1-diphosphonate, nitrilotriacetate, ethylenediaminotetracetate, ethylenediamine-N,N'-disuccinate in their salt and free acid forms.

Suitable for use in the detergent composition described herein is also a corrosion inhibitor, for example organic silver coating agents (especially paraffins such as WINOG 70 sold by Wintershall, Salzbergen, Germany), nitrogen-containing corrosion inhibitor compounds (for example benzotriazole and benzimadazole—see GB-A-1137741) and Mn(II) compounds, particularly Mn(II) salts of organic ligands.

Other suitable components for use in the detergent composition herein include enzyme stabilizers, for example calcium ion, boric acid and propylene glycol.

Other suitable components for use in the detergent composition herein include humectants, for example, as described in U.S. Patent Application Publication No. 2015/0329807.

Suitable rinse additives are known in the art. Commercial rinse aids for dishwashing typically are mixtures of low-foaming fatty alcohol polyethylene/polypropylene glycol ethers, solubilizers (for example cumene sulfonate), organic acids (for example citric acid) and solvents (for example ethanol). The function of such rinse aids is to influence the interfacial tension of the water in such a way that it is able to drain from the rinsed surfaces in the form of a thin coherent film, so that no water droplets, streaks, or films are left after the subsequent drying process. European Patent 0 197 434 B 1 describes rinse aids which contain mixed ethers as surfactants. Rinse additives such as fabric softeners and the like are also contemplated and suitable for encapsulation in a film according to the disclosure herein.

Suitable liquid laundry detergents (LLD) for testing the compatibility of the water-soluble films described herein with liquid laundry detergents are described in the tables below:

| LLD One | Wt. % |
| --- | --- |
| Monoethanolamine | 8-9% |
| Dodecylbenzenesulfonic Acid | 22-26% |
| Oleic Acid | 18-21% |
| Lauryl Alcohol Ethoxylate | 22-26% |
| Propylene Glycol | 8-11% |
| Diethylene Glycol | 8-11% |
| Water | 4-7% |

| LLD Two | Wt. % |
| --- | --- |
| Monoethanolamine | 8-9% |
| Dodecylbenzenesulfonic Acid | 22-26% |
| Oleic Acid | 18-21% |
| Lauryl Alcohol Ethoxylate | 22-26% |
| Propylene Glycol | 5-7% |
| Diethylene Glycol | 5-7% |
| Glycerin | 5-7 |
| Water | 4-8% |

Methods of Use

The films and articles described herein, as well as compositions contained therein, may be used to treat a substrate, e.g., fabric or a hard surface, for example by contacting the substrate with the film, article, and/or composition contained therein. The contacting step may occur manually or in an automatic machine, e.g., an automatic (top or front-loading) laundry machine or an automatic dishwashing machine. The contacting step may occur in the presence of water, which may be at a temperature up to about 80° C., or up to about 60° C., or up to about 40° C., or up to about 30° C., or up to about 20° C., or up to about 15° C., or up to about 10° C., or up to about 5° C. As noted above, the present films and articles made therefrom are particularly suited for cold water dissolution and therefore provide benefits in cold-water washes (e.g., from about 1° C. to about 30° C., or from about 5° C. to about 20° C.). The contacting step may be followed by a multi-rinse cycle or even by a single rinse cycle; because the film has good dissolution properties, less water is required to dissolve the film and/or release the contents contained therein.

Dissolution Chamber Residue Test

A water-soluble film characterized by or to be tested for undissolved residue according to the Dissolution Chamber (DC) Test is analyzed as follows using the following materials:

1. Beaker (4000 ml);
2. Stainless steel washers (3.5" (88.9 mm) OD, 1.875" ID (47.6 mm), 0.125" (3.18 mm) thick);
3. Styrene-butadiene rubber gaskets (3.375" (85.7 mm) OD, 1.91" ID (48.5 mm), 0.125" thick (3.18 mm));
4. Stainless steel screens (3.0" (76.2 mm) OD, 200×200 mesh, 0.0021" (0.053 mm) wire OD, 304SS stainless steel wire cloth);
5. Thermometer (0° C. to 100° C., accurate to +/−1° C.);
6. Cutting punch (1.5" (38.1 mm) diameter);
7. Timer (accurate to the nearest second);
8. Reverse osmosis (RO) water;
9. Binder clips (size #5 or equivalent);
10. Aluminum pans (2.0" (50.8 mm) OD); and
11. Sonicator.

For each film to be tested, three test specimens are cut from a selected test film having a thickness of 76 μm using the cutting punch. If cut from a film web made by a continuous process, the specimens should be cut from areas of web evenly spaced along the transverse direction of the web (i.e., perpendicular to the machine direction). Each test specimen is then analyzed using the following procedure:

1. Weigh the film specimen and track the specimen through the test. Record the initial film weight ($F_o$).
2. Weigh a set of two sonicated, clean, and dry screens for each specimen and track them through the test. Record the initial screen weights (collectively $S_o$ for the two screens combined).
3. Assemble a specimen dissolution chamber by flatly sandwiching the film specimen between the center of the two screens, followed by the two rubber gaskets (one gasket on each side between the screen and washer), and then the two washers.
4. Secure the dissolution chamber assembly with four binder clips evenly spaced around the washers and the clips folded back away from the screens.
5. Fill the beaker with 1,500 ml of RO water at laboratory room temperature (72+/−3° F., 22+/−2° C.) and record the room temperature.
6. Set the timer to a prescribed immersion time of 5 minutes.
7. Place the dissolution chamber assembly into the beaker and immediately start the timer, inserting the dissolution chamber assembly at an approximate 45 degree entry angle into the water surface. This entry angle helps remove air bubbles from the chamber. The dissolution chamber assembly rests on the beaker bottom such that the test specimen film is positioned horizontally about 10 mm from the bottom. The four folded-back binder clips of the dissolution chamber assembly are suitable to maintain the about 10 mm film clearance from the beaker bottom, however, any other equivalent support means may be used.
8. At the prescribed elapsed prescribed immersion time of 5 minutes, slowly remove the dissolution chamber assembly from the beaker at an approximate 45 degree angle.
9. Hold the dissolution chamber assembly horizontally over the aluminum pan to catch any drips from the screens and carefully remove the binder clips, washers, and gaskets. Do not break open the sandwiched screens.
10. Place the sandwiched screens (i.e., screen/residual undissolved film/screen) over the aluminum pan and into an oven at 100° C. for 30 minutes to dry.
11. Weigh the dried set of sandwiched screens including any residual undissolved film therein. Measure and add to this dried screen weight any dried film drippings captured in and recovered from (e.g., by scraping) the pan when the dissolution chamber assembly was first removed from the beaker and during drying. Record the final sandwiched screen weight (collectively $S_f$, including the dried film drippings).
12. Calculate % residue ("DC residue") left for the film specimen: % DC residue=$100*((S_f-S_o)/F_o)$.
13. Clean the sandwiched screens by soaking them in a beaker of RO water for about 20 minutes. Then, take them apart and do a final rinse in the sonicator (turned on and filled with RO water) for at least 5 minutes or until no residue is visible on the screens.

Suitable behavior of water-soluble films according to the disclosure is marked by DC residue values of about 35 wt. % or less, about 40 wt. % or less, about 45 wt. % or less or about 48 wt. % or less as measured by the DC Test. Generally, lower DC residue values are desirable to reduce the likelihood of residual film remaining on a washed article after aggressive washing conditions (e.g., in low water conditions (such as in overloading of the washing machine) and in cold wash water conditions). In various embodiments, the water-soluble film has a DC residue value of at least 1, 2, 5, 10, 12, 15, 25, 30, or 35 wt. % and/or up to about 15, 20, 30, 35, 40, 45, or 48 wt. %; (e.g., about 3 wt. % to about 48 wt. %, about 5 wt. % to about 48 wt. %, or about 12 wt. % to about 48 wt. %, or about 25 wt. % to about 48 wt. %, or about 10 wt. % to about 45 wt. %, or about 20 wt. % to about 45 wt. %, about 25 wt. % to about 40 wt. %, about 30 wt. % to about 40 wt. %, about 3 wt. % to about 40 wt. %, or about 3 wt. % to about 35 wt. %.).

Dissolution and Disintegration Test (MSTM 205)

A film can be characterized by or tested for Dissolution Time and Disintegration Time according to the MonoSol Test Method 205 (MSTM 205), a method known in the art. See, for example, U.S. Pat. No. 7,022,656.

Apparatus and Materials:
600 mL Beaker
Magnetic Stirrer (Labline Model No. 1250 or equivalent)
Magnetic Stirring Rod (5 cm)
Thermometer (0 to 100° C.±1° C.)
Template, Stainless Steel (3.8 cm×3.2 cm)
Timer (0-300 seconds, accurate to the nearest second)
Polaroid 35 mm slide Mount (or equivalent)
MonoSol 35 mm Slide Mount Holder (or equivalent)
Distilled water For each film to be tested, three test specimens are cut from a film sample that is a 3.8 cm×3.2 cm specimen. If cut from a film web, specimens should be cut from areas of web evenly spaced along the traverse direction of the web. Each test specimen is then analyzed using the following procedure.

Lock each specimen in a separate 35 mm slide mount.

Fill beaker with 500 mL of distilled water. Measure water temperature with thermometer and, if necessary, heat or cool water to maintain temperature at 20° C. (about 68° F.).

Mark height of column of water. Place magnetic stirrer on base of holder. Place beaker on magnetic stirrer, add magnetic stirring rod to beaker, turn on stirrer, and adjust stir speed until a vortex develops which is approximately one-fifth the height of the water column. Mark depth of vortex.

Secure the 35 mm slide mount in the alligator clamp of the 35 mm slide mount holder such that the long end of the slide mount is parallel to the water surface. The depth adjuster of the holder should be set so that when dropped, the end of the clamp will be 0.6 cm below the surface of the water. One of the short sides of the slide mount should be next to the side of the beaker with the other positioned directly over the center of the stirring rod such that the film surface is perpendicular to the flow of the water.

In one motion, drop the secured slide and clamp into the water and start the timer. Disintegration occurs when the film breaks apart. When all visible film is released from the slide mount, raise the slide out of the water while continuing to monitor the solution for undissolved film fragments. Dissolution occurs when all film fragments are no longer visible and the solution becomes clear.

The results should include the following: complete sample identification; individual and average disintegration and dissolution times; and water temperature at which the samples were tested.

Film disintegration times (I) and film dissolution times (I) can be corrected to a standard or reference film thickness using the exponential algorithms shown below in Equation 1 and Equation 2, respectively.

$$I_{corrected} = I_{measured} \times (\text{reference thickness/measured thickness})^{1.93} \quad [1]$$

$$S_{corrected} = S_{measured} \times (\text{reference thickness/measured thickness})^{1.83} \quad [2]$$

Tensile Strength Test and Modulus Test

A water-soluble film characterized by or to be tested for tensile strength according to the Tensile Strength (TS) Test and modulus (or tensile stress) according to the Modulus (MOD) Test is analyzed as follows. The procedure includes the determination of tensile strength and the determination of modulus at 10% elongation according to ASTM D 882 ("Standard Test Method for Tensile Properties of Thin Plastic Sheeting") or equivalent. An INSTRON tensile testing apparatus (Model 5544 Tensile Tester or equivalent) is used for the collection of film data. A minimum of three test specimens, each cut with reliable cutting tools to ensure dimensional stability and reproducibility, are tested in the machine direction (MD) (where applicable) for each measurement. Tests are conducted in the standard laboratory atmosphere of 23±2.0° C. and 35±5% relative humidity. For tensile strength or modulus determination, 1"-wide (2.54 cm) samples of a single film sheet having a thickness of 76 µm are prepared. The sample is then transferred to the INSTRON tensile testing machine to proceed with testing while minimizing exposure in the 35% relative humidity environment. The tensile testing machine is prepared according to manufacturer instructions, equipped with a 500 N load cell, and calibrated. The correct grips and faces are fitted (INSTRON grips having model number 2702-032 faces, which are rubber coated and 25 mm wide, or equivalent). The samples are mounted into the tensile testing machine and analyzed to determine the 100% modulus (i.e., stress required to achieve 100% film elongation) and tensile strength (i.e., stress required to break film).

Generally, higher TS values are desirable because they correspond to stronger pouch seals when the film is the limiting or weakest element of a seal.

Generally, higher MOD values are desirable because they correspond to pouches having a greater stiffness and a lower likelihood of deforming and sticking to each other when loaded on top of each other during production or in final consumer packaging.

Without intending to be bound by theory, it is believed that the change in modulus over time can be used to predict if a pouch containing a liquid laundry detergent will remain taut over time or if the pouch will lose tautness and take on a loose and droopy appearance and feel. In particular, without intending to be bound by theory, it is believed that a film having a greater positive change in modulus (Δ modulus) (positive slope or increase in modulus) over time will remain more taut for up to at least 12 weeks under ambient conditions or up to 38° C. and 80% RH conditions compared to films having a Δ modulus of about 0 and will remain substantially more taut than films having a negative Δ modulus.

Liquid Release Test

A water-soluble film and/or pouch characterized by or to be tested for delayed solubility according to the Liquid Release Test is analyzed as follows using the following materials:

2 L beaker and 1.2 liters of deionized (DI) water
Water soluble pouch to be tested; the film has a thickness of 76 µm; the pouch is pre-conditioned for two weeks at 38° C.
Thermometer
Wire cage
Timer Before running the experiment, ensure that enough DI water is available to repeat the experiment five times, and ensure that the wire cage and beaker are clean and dry.

The wire frame cage is a plastic coated wire cage (4"× 3.5"×2.5", or about 10 cm×9 cm×6 cm) with no sharp edges, or equivalent. The gauge of the wire should be about 1.25 mm and the wire should have openings the size of 0.5 inch (1.27 cm) squares. An example image of a cage 28 with test pouches 30 is shown in FIG. 1.

To set up for the test, carefully place the water soluble pouch in the cage while not scratching the pouch on the cage and allowing free space for the pouch to move. Do not bind the pouch tightly with the wire cage, while still ensuring it is secure and will not come out of the cage. The orientation of the pouch in the cage should be such that the natural buoyancy of the pouch, if any, is allowed (i.e. the side of the pouch that will float to the top should be placed towards the top). If the pouch is symmetrical, the orientation of the pouch generally would not matter.

Next, fill the 2 L beaker with 1200 milliliters of 20° C. DI water.

Figure 2:
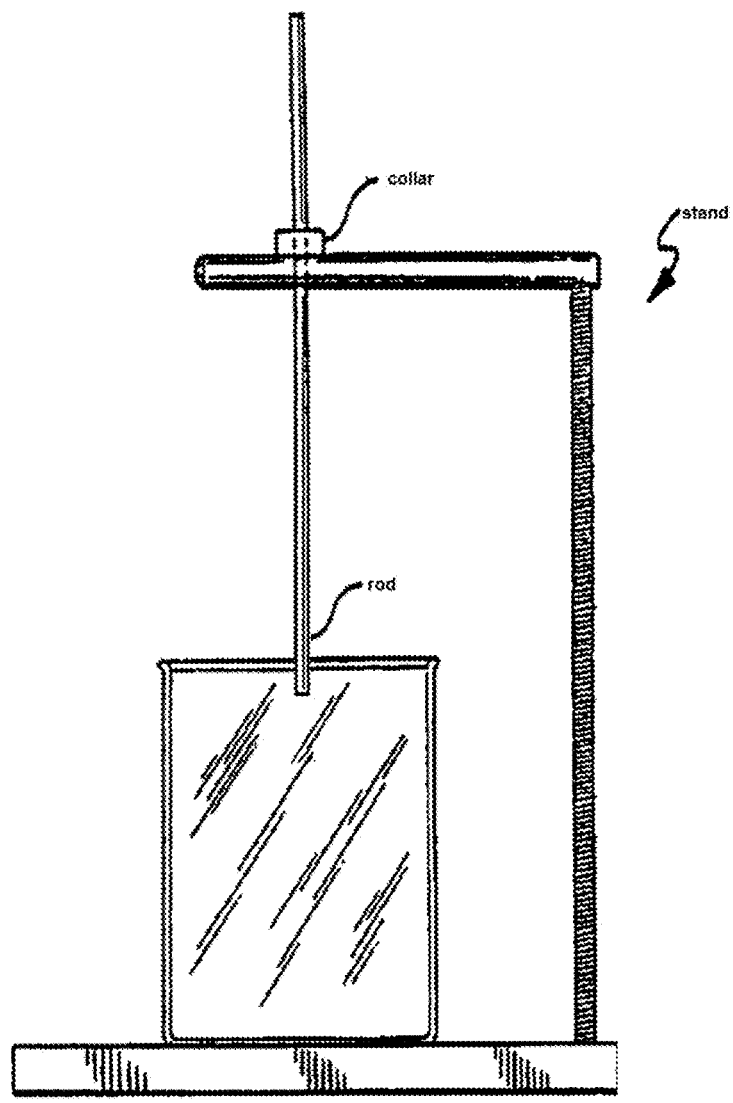
FIG. 2 shows an apparatus for performing the Liquid Release Test, including a beaker resting on a stand, the stand holding a rod for lowering a cage into the beaker, the rod being fixable by a collar with a set screw (not shown).

Next, lower the wire frame cage with the enclosed pouch into the water. Ensure that the cage is 1 inch (2.54 cm) from the bottom of the beaker. Be sure to fully submerge the pouch on all sides. Ensure that the cage is stable and will not move and start a timer as soon as the pouch is lowered into the water. The position of the cage with respect to the water in the beaker can be adjusted and maintained by any suitable means, for example by using a clamp fixed above the beaker, and a rod attached to the top of the cage. The clamp can engage the rod to fix the position of the cage, and tension on the clamp can be lowered in order to lower the cage into the water. Other means of frictional engagement can be used in the alternative to a clamp, for example a collar with a set screw, as shown in FIG. 2 (set screw not shown). FIG. 2 shows a beaker 30 resting on a stand 40, the stand holding a rod 50 for lowering a cage 10 (not shown) into the beaker 30, the rod 50 being able to hold a fixed vertical position by use of a collar 60 having a set screw (not shown) that engages the rod 50, for example by friction or by engagement with a hole (not shown) in the rod 50.

Liquid content release is defined as the first visual evidence of the liquid leaving the submerged pouch.

Use the timer to record when the liquid content is released in to the surrounding water (Release Time) with a stopping point of 45 seconds.

A pass or fail grade will be given to each pouch. A pass grade is received if the soluble pouch retained its liquid for 30 seconds or longer. A fail grade is received if the soluble pouch did not retain its liquid for at least 30 seconds.

Repeat this process with new DI water and a new water soluble pouch five times for each film being tested.

A total of at least 15 pouches are tested for each film sample type unless reported otherwise.

Compression Test Measurement

A water-soluble film and/or pouch characterized by or to be tested for the ability of a water soluble capsule to resist a mechanical compression strength of a minimum of 300 N according to the Compression Test Measurement is analyzed as follows using the following materials:

Instron Model 5544 (or equivalent)
At least 15 water-soluble pouches or capsules to be tested; the film having a thickness of 76 μm; the pouches are pre-conditioned for at least 24 hours at 23±1° C. ad 50±4% Relative Humidity.
Zipper type bags
Two flat plates (Top plate: 10 KN Max load T1223-1022/ Bottom plate: 100KN Max load T489-74)
Load cell (Static load ±2 kN, Max spindle torque 20 Nm, bolt torque 25 Nm, and weight 1.2 kg)
Marker
Allen wrench (6 mm)

A pouch is inspected for leaks and then placed into a zippered bag (approximately 57 micron thick on each side). Seal the bag with minimal air inside. Label the bag with the sample name and number.

Open the method for compression test. Ramp speed should be 4 mm/s.

Carefully place the sample, thermoformed side down, between the two plates making sure the pouch is on the center of the bottom plate. Move capsule inside the bag away from any edges.

Press start to run the test. As the two plates come together, the pouch will burst. Record the compression strength (e.g., in Newtons) and the location on the pouch where the rupture occurred. Repeat this process for all samples.

Suitable behavior of water-soluble films according to the disclosure is marked by pouches that have compression strength values of at least about 300 N and less than about 2000 N as measured by the Tautness Test Measurement. mm Film Swelling Test Measurement A water-soluble film and/or pouch characterized by or to be tested for the resistance to swelling in the presence of a liquid composition is analyzed as follows.

Three samples of a film are taken from different locations of the film from a roll on a larger film sample. Three 2 inch by 2 inch squares (about 5 cm×5 cm) are cut with a punch. The weight and gauge of each sample is measured and recorded.

For each sample, the weight of a petri dish is tared out and 12 g of a testing fluid is added to the dish. A film sample is added to the petri dish in the center of the base. Additional testing fluid is added until 20 g of testing fluid is present in the petri dish and the film sample is completely covered and submerged in the testing fluid. A cap or cover is placed onto the petri dish.

Each petri dish is wrapped with parafilm and placed in a conditioning oven at a temperature of 38° C. and an RH of 80%, for 24 hours.

A measuring grid is placed on a horizontal surface. After conditioning, the petri dishes are unwrapped and the film samples removed. The film samples are placed on the measuring grid. The film sample length and width are recorded, noting which is the machine direction. The testing fluid is wiped from the surface of the film sample, using a KimWipe® or equivalent. The weight and gauge of the film sample is recorded.

The swelling ratio is the ratio of the weight added to the film over the initial weight (e.g., (weight final−weight initial)/weight initial)).

For the water-soluble films of the disclosure including a blend of PVOH resins, suitable behavior of water-soluble films according to the disclosure is characterized relative to an identical water-soluble film including only the first PVOH copolymer. In particular, suitable behavior of water-soluble films according to the disclosure are marked by a swelling ratio value, as measured by the Film Swelling Test Measurement, that is no greater than 60% of the swelling ratio value of a comparative film which is identical but for the second PVOH copolymer being the sole resin and the amount of that second PVOH copolymer in the comparative film being equal to the total amount of resins in the inventive water-soluble film.

Swelling introduces a change in the dimensions of the film which can result in a less taut package, as the final film area is greater, but encapsulating the same volume of liquid.

Crystallinity Test Measurement

A water-soluble film and/or pouch characterized by or to be tested for the crystallinity of the film is analyzed as follows.

Film samples are conditioned in an environment of 22° C. and 40% RH for at least 24 hours. A 3 mm by 3 mm moisture-conditioned film sample is then mounted in a sealed cell. A WAXD measurement is then performed with a D8 Discover x-ray diffractometer or equivalent, equipped with a two-dimensional detector (Bruker AXS Co., Ltd.) using an exposure time of 600 seconds.

A one dimensional profile (Intensity vs. 2theta) is obtained by averaging ring like diffraction data of a photographic image. A blank profile is obtained and subtracted from the sample profile to provide a background subtracted profile. A straight line connecting the intensity values of diffraction angles at 15 degrees and 25 degrees is subtracted form the background subtracted profile to provide a baseline.

Let a Gaussian function reproduce intensity values in the range of diffraction angles from 15 degrees to 17.6 degrees and intensity values in the range from 21 degrees to 21.6 degrees as a scattering function from amorphous PVOH. Find a peak position, a peak width, and a peak height of the Gaussian function with least squares fitting. Reproduce diffraction signals of 19.5 degrees and 23 degrees which are attributed to the 110 diffraction and the 200 diffraction from the PVOH crystal with two Gaussian functions. Find a peak position, a peak width, and a peak height with least squares fitting. The parameters of the Gaussian function assumed to be amorphous PVOH are fixed. The fitting parameters of the Gaussian functions regarded as the crystals are fixed, and three parameters of the Gaussian function attributed to amorphous PVA are again least squares fitted. Find the integrated intensity values of the three Gaussian functions. The apparent crystallinity is calculated as a percentage of the sum of the integrated intensity values of the two Gaussian functions attributed to crystal PVOH in the total integrated intensity values.

Without intending to be bound by theory, it is believed that the crystallinity of a water-soluble film can be reduced by increasing the level on anionic monomer unit included in the resin, decreasing the degree of hydrolysis of the resin, increasing the amount of plasticizer provided in the film formulation, and/or cooling the water-soluble film quickly after casting. Further, without intending to be bound by theory, it is believed that, in general, the lower the crystallinity of a film, the more the film will swell when in contact with a liquid composition.

The water soluble films in accordance with the disclosure can be better understood in light of the following examples, which are merely intended to illustrate the water soluble films and are not meant to limit the scope thereof in any way.

EXAMPLES

Example 1: Single Resin Film

Example 1 represents a water-soluble film which was formed with a single PVOH copolymer, Resin A. Resin A was a commercially available PVOH copolymer having a specification degree of hydrolysis of 89% to 93%, having a specification level of comonomer of 1.75 mol. % level of incorporation (e.g., modification) of maleic anhydride (sodium salt) and 3.5 mol. % pendant groups, and having a specified 4% solution viscosity at 20° C. of 23 cP. The film included (i) Resin A (100 weight parts), (ii) glycerin plasticizer (24.67 weight parts per hundred parts resin (phr)), (iii) sorbitol plasticizer (13.02 phr), (iv) trimethylolpropane plasticizer (5.33 phr), (v) propylene glycol plasticizer (0.49 phr), (vi) filler (4.85 phr as bulking agent and antiblocking agent), (vii) surfactants and other process aids (3.15 phr including antioxidant, defoaming agent, amine oxide surfactant, and cationic surfactant), and residual water (about 5-12 phr). Aqueous compositions of the foregoing were cast and dried to form 76 μm thick film samples, which were tested for DC residue values values by the above methods. The resin and film properties for samples of films according to Example 1 at ambient conditions (e.g., 23° C. and 35% relative humidity (RH)), prior to exposure to a liquid laundry detergent, are summarized in Table 1. In Table 1, the pendant group (P) content for the films is provided on a molar basis relative to the PVOH resins in the film (i.e., excluding the plasticizers and the other non-resin components thereof), and the P value further indicates that the pendant group corresponds to a maleic anhydride comonomer unit (M).

Example 2: Single Resin Film

Example 2 represents water-soluble films which were formed including a single PVOH copolymer, Resin B. Resin B was a commercially available PVOH copolymer have a specification degree of hydrolysis in the range of 88-92%, having 4.0 mol. % level of incorporation (e.g. modification) of maleic anhydride (sodium salt) comonomer and 8.0 mol. % pendant groups, and having a specified 4% solution viscosity at 20° C. of nominally 15-20 cP. The film included Resin B (100 weight parts) and non-resin components in the amounts and types as described in Example 1. Films were prepared and tested as described in Example 1. Table 1 summarizes the resin and film properties for samples of films according to Example 2 at ambient conditions (e.g., 23° C. and 35% RH), prior to exposure to a liquid laundry detergent. In Table 1, the anionic pendant group (P) content for the film is provided on a molar basis relative to the PVOH resins in the film (i.e., excluding the plasticizers and the other non-resin components thereof), and the P value further indicates that the anionic monomer corresponds to a maleic anhydride comonomer unit (M).

TABLE 1

Resin and Film Data for Examples 1 and 2

| | Resin | | | | Film | |
|---|---|---|---|---|---|---|
| Example | Type | μ (cP) | DH (%) | P (mol. %) | DC (%) | P (mol. %) |
| 1 | A | 23 | 91.0 | 3.50 (M) | 22.51 | 3.50 (M) |
| 2 | B | 17.5 | 90.0 | 8.00 (M) | 0.87 | 8.00 (M) |

Thus, Table 1 shows that water-soluble films prepared from a PVOH—maleate copolymer having a modification level in a range of about 1.5 to about 2 mol % (Resin A) have higher residue values (DC values) compared to water-soluble film prepared from a PVOH-maleate copolymer having a modification level in a range of about 3 mol % to about 5 mol % (Resin B).

Example 3: Single Resin Film

Example 3 represents a water-soluble film which was formed with Resin A, as described in Example 1. The film included (i) Resin A (100 weight parts), (ii) glycerin plasticizer (6.66 phr), (iii) sorbitol plasticizer (6.24 phr), (iv) 2-methyl-1,3-propanediol plasticizer (13.32 phr), (v) filler (2.67 phr as bulking agent and antiblocking agent), (vi) surfactants and other process aids (0.83 phr including antioxidant, defoaming agent, and nonionic surfactant), and residual water (about 5-12 phr). Films were prepared and tested as described in Example 1. The resin and film properties for samples of films according to Example 3 at ambient conditions (e.g., 23° C. and 35% RH), prior to exposure to a liquid laundry detergent, are summarized in Table 2. In Table 2, the pendant group (P) content for the films is provided on a molar basis relative to the PVOH resins in the film (i.e., excluding the plasticizers and the other non-resin components thereof), and the P value further indicates that the pendant group corresponds to a maleic anhydride copolymer unit (M).

Example 4: Single Resin Film

Example 4 represents water-soluble films which were formed including a single PVOH copolymer, Resin B, as described above in Example 2. The film included Resin B (100 weight parts), and non-resin components in the amounts and types as described in Example 3. Films were prepared and tested as described in Example 1. Table 2 summarizes the resin and film properties for samples of films according to Example 4 at ambient conditions (e.g. 23° C. and 35% RH), prior to exposure to a liquid laundry detergent. In Table 2, the anionic pendant group (P) content for the film is provided on a molar basis relative to the PVOH resins in the film (i.e., excluding the plasticizers and the other non-resin components thereof), and the P value further indicates that the anionic monomer corresponds to a maleic anhydride comonomer unit (M).

TABLE 2

Resin and Film Data for Examples 3 and 4

| | | Resin | | | Film | |
|---|---|---|---|---|---|---|
| Example | Type | μ (cP) | DH (%) | P (mol. %) | DC (%) | P (mol. %) |
| 3 | A | 23 | 91.0 | 3.50 (M) | 31.59 | 3.50 (M) |
| 4 | B | 17.5 | 90.0 | 8.00 (M) | 0.86 | 8.00 (M) |

Thus, Table 2 shows that water-soluble films prepared from a PVOH—maleate copolymer having between about 1.5 mol % and about 2 mol % modification (Resin A) have higher residue values (DC values) compared to water-soluble film prepared from a PVOH-maleate copolymer having between about 3 mol % and about 5 mol % modification (Resin B). Further, a comparison of Examples 1 and 2 to Examples 3 and 4 demonstrates that the films prepared from the PVOH-maleate copolymer having between about 1.5 and about 2 mol % modification (Resin A) had higher residue values relative to the films prepared from the PVOH-maleate copolymer having between about 3 and about 5 mol % modification (Resin B), at both high plasticizer levels (e.g., greater than 30 phr total, Examples 1 and 2) and a low plasticizer levels (e.g., less than 30 phr total, Examples 3 and 4).

Examples 5-8: Two-Resin Blend Films

Examples 5-8 represent water-soluble films which were formed, each including a blend of the two copolymer Resins A and B, as described in the foregoing Examples 1 to 4. Specific blends include 80 wt. % Resin A and 20 wt. % Resin B (Example 5), 60 wt. % Resin A and 40 wt. % Resin B (Example 6), 40 wt. % Resin A and 60 wt. % Resin B (Example 7), and 20 wt. % Resin A and 80 wt. % Resin B (Example 8). The blend films included two resins that made up 100% of the resin in the film, while plasticizers and other non-resin components were present in the amounts and types as described for Example 1. Films were prepared and tested as described in Example 1. Table 3 summarizes the resin and film properties for Examples 5-8. The first and last entries for Table 3 represent the single-resin limit for the film formulation (i.e., Examples 1 and 2), while the remaining values represent the two-resin blend formulations. In Table 3, the pendant group (P) content for the films is provided on a molar basis relative to all of the polymeric resin in the film (i.e., including both resins present but excluding the plasticizers and the other non-resin components thereof), and the P values further indicates that the anionic comonomer unit corresponds to a maleic anhydride comonomer unit (M).

TABLE 3

Resin and Film Data for Examples 5-8

| | Resins | | | Film | | |
|---|---|---|---|---|---|---|
| Example | Type | Amt. (wt. %) | Type | Amt. (wt. %) | DC (%) | % Crystallinity | P (mol. %) |
| 1 | A | 100 | B | 0 | 22.51 | 20.4* | 3.50 (M) |
| 5 | A | 80 | B | 20 | 17.28* | 18.4* | 4.4 (M) |
| 6 | A | 60 | B | 40 | 10.42* | 17.3* | 5.3 (M) |
| 7 | A | 40 | B | 60 | 8.32* | 15.9* | 6.2 (M) |
| 8 | A | 20 | B | 80 | 1.83* | 14.9* | 7.1 (M) |
| 2 | A | 0 | B | 100 | 0.87* | 14.7 | 8.00 (M) |

Examples 5-8 illustrate that water-soluble films including PVOH resin blends having a first copolymer comprising a first level of anionic monomer modification and a second copolymer comprising a second level of anionic monomer modification, as described herein, can exhibit a combination of substantially advantageous, yet competing, physical and chemical properties when the PVOH resin blends are selected in view of their particular blend constituents, the relative amounts of the blend constituents, or both. For example, as noted above, films that are particularly suitable for composition-in-pouch delivery applications satisfy at least one of the following threshold values (a) a DC residue value of about 20 wt. % or less to reduce or eliminate film residue on articles in washing applications, and (b) a crystallinity of at least 15% to create stiff pouches less likely to soften and droop when formed into pouches enclosing liquid compositions. Desirably, a film meets the DC residue criteria (a) and crystallinity criteria (b).

As illustrated in the single-resin film data of Examples 1 and 2, desirable DC values are often in competition with desirable TS and/or MOD values. For example, the film of Example 2 (Resin B) had a desirably low DC residue value but crystallinity value.

As shown in Examples 5-8, it unexpectedly has been found that certain water-soluble films containing PVOH resin blends with a first PVOH copolymer comprising a first level of anionic monomer incorporation as described herein and a second PVOH copolymer comprising a second level of anionic monomer incorporation as described herein meet criteria (a) and/or (b). In Table 3, film properties marked with an "*" satisfy the criteria for (a) and/or (b). From the data, it is seen that films including PVOH resin blends including two PVOH anionic copolymers, as exemplified by Examples 5-8, generally meet both criteria (a) and (b) for A/B blend ratios ranging from about 20/80 to about 80/20 (w/w, respectively).

Examples 9-12: Two-Resin Blend Films

Examples 9-12 represent water-soluble films which were formed, each including a blend of the two copolymer Resins A and B. Specific blends include 80 wt. % Resin A and 20 wt. % Resin B (Example 9), 60 wt. % Resin A and 40 wt. % Resin B (Example 10), 40 wt. % Resin A and 60 wt. % Resin B (Example 11), and 20 wt. % Resin A and 80 wt. % Resin B (Example 12). The blend films included two resins that made up 100% of the resin in the film, while plasticizers and other additives were present in the amounts and types as described for Example 3. Films were prepared and tested as described in Example 1. Table 4 summarizes the resin and film properties for Examples 9-12. The first and last entries for Table 4 represent the single-resin limit for the film formulation (i.e., Examples 3 and 4), while the remaining values represent the two-resin blend formulations. In Table 4, the pendant group (P) content for the film is provided on a molar basis relative to all of the polymeric resin in the film (i.e., including both resins present but excluding the plasticizers and the other non-resin components thereof), and the P values further indicate they correspond to a maleic anhydride comonomer unit (M).

TABLE 4

Resin and Film Data for Examples 3, 4, and 9-12

| | Resins | | | Film | | |
|---|---|---|---|---|---|---|
| Example | Type | Amt. (wt. %) | Type | Amt. (wt. %) | DC (%) | % Crystallinity | P (mol. %) |
| 3 | A | 100 | B | 0 | 31.59 | 18.5* | 3.5 (M) |
| 9 | A | 80 | B | 20 | 22.89 | 18.8* | 4.4 (M) |
| 10 | A | 60 | B | 40 | 14.19* | 19.0* | 5.3 (M) |
| 11 | A | 40 | B | 60 | 5.34* | 17.8* | 6.2 (M) |
| 12 | A | 20 | B | 80 | 4.29* | 17.3* | 7.1 (M) |
| 4 | A | 0 | B | 100 | 0.89* | 14.7 | 8.00 (M) |

Examples 9-12 illustrate that water-soluble films including PVOH resin blends having a first copolymer comprising a first level of anionic monomer modification and a second copolymer comprising a second level of anionic monomer modification, as described herein, can exhibit a combination of substantially advantageous, yet competing, physical and chemical properties when the PVOH resin blends are selected in view of their particular blend constituents, the relative amounts of the blend constituents, or both. For example, as noted above, films that are particularly suitable for composition-in-pouch delivery applications satisfy at least one of the criteria set forth in Examples 5 to 8. Desirably, a film meets the DC residue criteria (a) DC residue and (b) crystallinity.

As illustrated in the single-resin film data of Examples 3 and 4, desirable DC values are often in competition with desirable crystallinity values. For example, the film of Example 3 (Resin A) had an undesirably low DC residue value but acceptable crystallinity.

As shown in Examples 9-12, it unexpectedly has been found that certain water-soluble films containing PVOH resin blends with a first PVOH copolymer comprising a first level of anionic monomer incorporation as described herein and a second PVOH copolymer comprising a second level of anionic monomer incorporation as described herein meet criteria (a) and/or (b). In Table 4, film properties marked with an "*" satisfy criteria (a) and/or (b). From the data, it is seen that films including PVOH resin blends including two PVOH anionic copolymers, as exemplified by Examples 9-12, generally meet both criteria for A/B blend ratios ranging from about 20/80 to about 80/20 (w/w, respectively).

Examples 13-18: Single Resin Film Exposed to LLD

Films prepared with Resin A according to Example 1 were exposed to liquid laundry detergent one (LLD 1) as described herein. The films were tested for DC residue values by the above methods after storing in contact with the LLD 1 for 3, 6, 9, or 12 weeks at ambient conditions (23° C., 35% RH) or a high stress 38° C., 80% RH environment. The average DC values, TS values and MOD values are summarized in Table 5. In Table 5, the pendant group (P) content for the films is provided on a molar basis relative to the PVOH resins in the film (i.e., excluding the plasticizers and the other non-resin components thereof), and the P value further indicates that the pendant group corresponds to a maleic anhydride comonomer unit (M). The first entry for Table 5 represent the single-resin limit for the film formulation (i.e., Example 1).

TABLE 5

Resin and Film Data for Examples 1 and 13-18

| Example | Type | Weeks Stored | Environment Conditions | DC (%) | P (mol. %) |
|---|---|---|---|---|---|
| 1 | A | 0 | 23° C., 35% RH | 22.51 | 3.5 (M) |
| 13 | A | 3 | 23° C., 35% RH | 25.24 | 3.5 (M) |
| 14 | A | 6 | 23° C., 35% RH | 32.05 | 3.5 (M) |
| 15 | A | 12 | 23° C., 35% RH | 29.21 | 3.5 (M) |
| 16 | A | 3 | 38° C., 80% RH | 24.40 | 3.5 (M) |
| 17 | A | 6 | 38° C., 80% RH | 20.66 | 3.5 (M) |
| 18 | A | 12 | 38° C., 80% RH | 20.05* | 3.5 (M) |

Thus, Table 5 demonstrates that for a single resin film having a PVOH copolymer having between about 1.5 and about 2 mol % maleate modification the DC residue values generally increase after exposure to liquid laundry detergent and after storage at ambient temperature and humidity. In Table 5, film properties marked with an "*" satisfy criteria (a), as described in Examples 5 to 8.

Examples 19-24: Single Resin Film Exposed to LLD

Films prepared with Resin A according to Example 3 were exposed to liquid laundry detergent one (LLD 1) as described herein. The films were tested for DC residue values as described for Examples 13 to 18. The average DC values are summarized in Table 6. In Table 6, the pendant group (P) content for the films is provided on a molar basis relative to the PVOH resins in the film (i.e., excluding the plasticizers and the other non-resin components thereof), and the P value further indicates that the pendant group corresponds to a maleic anhydride comonomer unit (M). The first entry for Table 6 represent the single-resin limit for the film formulation (i.e., Example 3).

TABLE 6

Resin and Film Data for Examples 3 and 19-24

| Example | Type | Weeks Stored | Environment Conditions | DC (%) | P (mol. %) |
|---|---|---|---|---|---|
| 3 | A | 0 | 23° C., 35% RH | 31.59 | 3.5(M) |
| 19 | A | 3 | 23° C., 35% RH | 29.88 | 3.5(M) |
| 20 | A | 6 | 23° C., 35% RH | 32.88 | 3.5(M) |
| 21 | A | 12 | 23° C., 35% RH | 36.92 | 3.5(M) |
| 22 | A | 3 | 38° C., 80% RH | 27.10 | 3.5(M) |
| 23 | A | 6 | 38° C., 80% RH | 22.16 | 3.5(M) |
| 24 | A | 12 | 38° C., 80% RH | 32.06 | 3.5(M) |

Thus, Table 6 demonstrates that for a single resin film having a PVOH copolymer having between about 1.5 mol % and less 2 mol % maleate modification, the DC residue values generally remain consistent after exposure to liquid laundry detergent and after storage at ambient temperature and humidity and 38° C. and 85% RH. In Table 6, film properties marked with an "*" satisfy criteria (a), as described in Examples 5 to 8.

Examples 25-30: Single Resin Film Exposed to LLD

Films were prepared with Resin B according to Example 2. The resulting films were exposed to liquid laundry detergent one (LLD 1) as described herein and tested for DC residue values as described for Examples 13 to 18. The average DC values are summarized in Table 7. In Table 7, the pendant group (P) content for the film is provided on a molar basis relative to the PVOH resins in the film (i.e., excluding the plasticizers and the other non-resin components thereof), and the P value further indicates that the pendant group corresponds to a maleic anhydride comonomer unit (M).

TABLE 7

Resin and Film Data for Examples 2 and 25-30

| Example | Type | Weeks Stored | Environment Conditions | DC (%) | P (mol. %) |
|---|---|---|---|---|---|
| 2 | B | 0 | 23° C., 35% RH | 1.94* | 8.00 (M) |
| 25 | B | 3 | 23° C., 35% RH | 8.47* | 8.00 (M) |
| 26 | B | 6 | 23° C., 35% RH | 6.33* | 8.00 (M) |
| 27 | B | 12 | 23° C., 35% RH | 13.75* | 8.00 (M) |
| 28 | B | 3 | 38° C., 80% RH | 6.19* | 8.00 (M) |
| 29 | B | 6 | 38° C., 80% RH | 5.72* | 8.00 (M) |
| 30 | B | 12 | 38° C., 80% RH | 11.95* | 8.00 (M) |

Thus, Table 7 demonstrates that for a single resin film having a PVOH copolymer including a maleate modification between about 3 mol % and about 5 mol %, the DC residue values generally increases after exposure to liquid laundry detergent and storage. In Table 7, film properties marked with an "*" satisfy criteria (a), as described in Examples 5 to 8.

Further, the combined data of Table 5 and Table 7 show that water-soluble films that have been exposed to a liquid laundry detergent and stored for 3, 6, or 12 weeks prepared from a PVOH copolymer having between about 1.5 and about 2 mol % maleate modification (Resin A) have higher residue values (DC values) compared to water-soluble films that have been exposed to a liquid laundry detergent and stored for 3, 6, or 12 weeks prepared from a PVOH copolymer having between about 3 and about 5 mol % maleate modification (Resin B).

Examples 31-36: Single Resin Film Exposed to LLD

Films were prepared with Resin B according to Example 4. The resulting films were exposed to liquid laundry detergent one (LLD 1) as described herein and tested for DC residue values, as described in Examples 13 to 18. The average DC values are summarized in Table 8. In Table 8, the pendant group (P) content for the film is provided on a molar basis relative to the PVOH resins in the film (i.e., excluding the plasticizers and the other non-resin components thereof), and the P value further indicates that the pendant group corresponds to a maleic anhydride comonomer unit (M).

TABLE 8

Resin and Film Data for Examples 4 and 31-36

| Example | Type | Weeks Stored | Environment Conditions | DC (%) | P (mol. %) |
|---|---|---|---|---|---|
| 4 | B | 0 | 23° C., 35% RH | 0.86* | 8.00 (M) |
| 31 | B | 3 | 23° C., 35% RH | 7.94* | 8.00 (M) |
| 32 | B | 6 | 23° C., 35% RH | 4.46* | 8.00 (M) |
| 33 | B | 12 | 23° C., 35% RH | 9.10* | 8.00 (M) |
| 34 | B | 3 | 38° C., 80% RH | 3.94* | 8.00 (M) |
| 35 | B | 6 | 38° C., 80% RH | 2.69* | 8.00 (M) |
| 36 | B | 12 | 38° C., 80% RH | 6.12* | 8.00 (M) |

Thus, Table 8 demonstrates that for a single resin film having a PVOH copolymer including a maleate modification between about 3 mol % and about 5 mol % and pendant groups, the the DC residue values generally increase after exposure to liquid laundry detergent and storage, though at a much slower rate than for the single resin film having a PVOH copolymer having between about 1.5 and about 2 mol % maleate modification (i.e., Examples 19 to 24 in Table 6). In Table 8, film properties marked with an "*" satisfy criteria (a), as described in Examples 5 to 8.

Examples 37-42: Two-Resin Blend Films

Examples 37-42 represent water-soluble films which were formed, each including a blend of the two copolymer Resins A and B. The films each included 80 wt. % Resin A and 20 wt. % Resin B. The blend films included the two resins that made up 100% of the resin in the film, while plasticizers and other non-resin components were present in the amounts and types as described for Example 1. Films were prepared as described for Example 1 and tested as described for Examples 13 to 18. The average DC values are summarized in Table 9. In Table 9, the pendant group (P) content for the films is provided on a molar basis relative to all of the polymeric resin in the film (i.e., including both resins present but excluding the plasticizers and the other non-resin components thereof), and the P value further indicates a maleic anhydride comonomer unit (M).

TABLE 9

Resin and Film Data for Examples 37-42

| Example | Type (Ratio of A/B) | Weeks Stored | Environment Conditions | DC (%) | P (mol. %) |
|---|---|---|---|---|---|
| 37 | 80/20 | 3 | 23° C., 35% RH | 19.72* | 4.4 (M) |
| 38 | 80/20 | 6 | 23° C., 35% RH | 28.41 | 4.4 (M) |
| 39 | 80/20 | 12 | 23° C., 35% RH | 20.97 | 4.4 (M) |
| 40 | 80/20 | 3 | 38° C., 80% RH | 16.75* | 4.4 (M) |
| 41 | 80/20 | 6 | 38° C., 80% RH | 19.03* | 4.4 (M) |
| 42 | 80/20 | 12 | 38° C., 80% RH | 15.52* | 4.4 (M) |

In Table 9, film properties marked with an "*" satisfy criteria (a), as described in Examples 5 to 8. As shown in Examples 37-42, it unexpectedly has been found that certain water-soluble films containing PVOH resin blends with 80 wt. % of a first PVOH copolymer comprising a first level of anionic monomer incorporation as described herein and 20 wt. % of a second PVOH copolymer comprising a second level of anionic monomer incorporation as described herein generally meet criteria (a) up to at least 12 weeks of storage at 38° C., 80% RH conditions.

Examples 43-48: Two-Resin Blend Films

Examples 43-48 represent water-soluble films which were formed, each including a blend of the two copolymer Resins A and B. The films each included 80 wt. % Resin A and 20 wt. % Resin B. The blend films included the two resins that made up 100% of the resin in the film, while plasticizers and other non-resin components were present in the amounts and types as described for Example 3. Films were prepared as described for Example 1 and tested as described for Examples 13 to 18. The average DC values are summarized in Table 10. In Table 10, the pendant group (P) content for the film is provided on a molar basis relative to all of the polymeric resin in the film (i.e., including both resins present but excluding the plasticizers and the other non-resin components thereof), and the P value further indicates a maleic anhydride comonomer unit (M).

TABLE 10

Resin and Film Data for Examples 43-48

| Example | Type (Ratio of A/B) | Weeks Stored | Environment Conditions | DC (%) | P (mol. %) |
|---|---|---|---|---|---|
| 43 | 80/20 | 6 | 23° C., 35% RH | 16.46* | 4.4 (M) |
| 44 | 80/20 | 9 | 23° C., 35% RH | 25.57 | 4.4 (M) |
| 45 | 80/20 | 12 | 23° C., 35% RH | 17.5* | 4.4 (M) |
| 46 | 80/20 | 6 | 38° C., 80% RH | 18.54* | 4.4 (M) |
| 47 | 80/20 | 9 | 38° C., 80% RH | 21.53 | 4.4 (M) |
| 48 | 80/20 | 12 | 38° C., 80% RH | 19.57* | 4.4 (M) |

In Table 10, film properties marked with an "*" satisfy criteria (a), as described in Examples 5 to 8. As shown in Examples 43-48, it unexpectedly has been found that certain water-soluble films containing PVOH resin blends with 80 wt. % of a first PVOH copolymer comprising a first level anionic monomer incorporation as described herein and 20 wt. % of a second PVOH copolymer comprising a second level of anionic monomer incorporation as described herein generally meet criteria (a) up to at least 12 weeks of storage at ambient conditions and at 38° C., 80% RH conditions.

Examples 49-54: Two-Resin Blend Films

Examples 49-53 represent water-soluble films which were formed, each including a blend of the two copolymer Resins A and B. The films each included 60 wt. % Resin A and 40 wt. % Resin B. The blend films included the two resins that made up 100% of the resin in the film, while plasticizers and other non-resin components were present in the amounts and types as described for Example 1. Films were prepared as described for Example 1 and tested as described for Examples 13 to 18. The average DC values are summarized in Table 11. In Table 11, the pendant group (P) content for the film is provided on a molar basis relative to all of the polymeric resin in the film (i.e., including both resins present but excluding the plasticizers and the other non-resin components thereof), and the P values further indicates a maleic anhydride comonomer unit (M).

TABLE 11

Resin and Film Data for Examples 49-54

| Example | Type (Ratio of A/B) | Weeks Stored | Environment Conditions | DC (%) | (mol. %) |
|---|---|---|---|---|---|
| 49 | 60/40 | 3 | 23° C., 35% RH | 22.79 | 5.3 (M) |
| 50 | 60/40 | 6 | 23° C., 35% RH | 26.34 | 5.3 (M) |
| 51 | 60/40 | 12 | 23° C., 35% RH | 15.23* | 5.3 (M) |
| 52 | 60/40 | 3 | 38° C., 80% RH | 15.14* | 5.3 (M) |
| 53 | 60/40 | 6 | 38° C., 80% RH | 19.91* | 5.3 (M) |
| 54 | 60/40 | 12 | 38° C., 80% RH | 12.56* | 5.3 (M) |

In Table 11, film properties marked with an "*" satisfy criteria (a), as described in Examples 5 to 8. As shown in Examples 49-54, it unexpectedly has been found that certain water-soluble films containing PVOH resin blends with about 60 wt. % a first PVOH copolymer comprising a first level of anionic monomer incorporation as described herein and about 40 wt. % of a second PVOH copolymer comprising a second level of anionic monomer incorporation as described herein generally meet criteria (a)-(c) up to at least 12 weeks of storage at 38° C., 80% RH conditions.

Examples 55-60: Two-Resin Blend Films

Examples 55-60 represent water-soluble films which were formed, each including a blend of the two copolymer Resins A and B. The films each included 60 wt. % Resin A and 40 wt. % Resin B. The blend films included the two resins that made up 100% of the resin in the film, while plasticizers and other non-resin components were present in the amounts and types as described for Example 3. Films were prepared as described for Example 1 and tested as described for Examples 13 to 18. The average DC values are summarized in Table 12. In Table 12, the pendant group (P) content for the film is provided on a molar basis relative to all of the polymeric resin in the film (i.e., including both resins present but excluding the plasticizers and the other non-resin components thereof), and the P values further indicates that the comonomer corresponds to a maleic anhydride comonomer unit (M).

TABLE 12

Resin and Film Data for Examples 55-60

| Example | Type (Ratio of A''/B) | Weeks Stored | Environment Conditions | DC (%) | P (mol. %) |
|---|---|---|---|---|---|
| 55 | 60/40 | 6 | 23° C., 35% RH | 19.71* | 5.3 (M) |
| 56 | 60/40 | 9 | 23° C., 35% RH | 10.69* | 5.3 (M) |
| 57 | 60/40 | 12 | 23° C., 35% RH | 16.51* | 5.3 (M) |
| 58 | 60/40 | 6 | 38° C., 80% RH | 15.43* | 5.3 (M) |
| 59 | 60/40 | 9 | 38° C., 80% RH | 13.80* | 5.3 (M) |
| 60 | 60/40 | 12 | 38° C., 80% RH | 10.78* | 5.3 (M) |

In Table 12, film properties marked with an "*" satisfy criteria (a), as described in Examples 5 to 8. As shown in Examples 55-60, it unexpectedly has been found that certain water-soluble films containing PVOH resin blends with about 60 wt. % a first PVOH copolymer comprising a first level of anionic monomer incorporation as described herein and about 40 wt. % of a second PVOH copolymer comprising a second level of anionic monomer incorporation as described herein meet criteria (a) up to at least 12 weeks of storage at ambient conditions and up to at least 12 weeks of storage at 38° C., 80% RH conditions.

Examples 61-66: Two-Resin Blend Films

Examples 61-66 represent water-soluble films which were formed, each including a blend of the two copolymer Resins A and B. The films each included 40 wt. % Resin A and 60 wt. % Resin B. The blend films included the two resins that made up 100% of the resin in the film, while plasticizers and other non-resin components were present in the amounts and types as described for Example 1. Films were prepared as described for Example 1 and tested as described for Examples 13 to 18. The average DC values are summarized in Table 13. In Table 13, the pendant group (P) content for the film is provided on a molar basis relative to all of the polymeric resin in the film (i.e., including both resins present but excluding the plasticizers and the other non-resin components thereof), and the P values further indicates a maleic anhydride comonomer unit (M).

TABLE 13

Resin and Film Data for Examples 61-66

| Example | Type (Ratio of A/B) | Weeks Stored | Environment Conditions | DC (%) | P (mol. %) |
|---|---|---|---|---|---|
| 61 | 40/60 | 3 | 23° C., 35% RH | 15.94* | 6.2 (M) |
| 62 | 40/60 | 6 | 23° C., 35% RH | 24.93 | 6.2 (M) |
| 63 | 40/60 | 12 | 23° C., 35% RH | 5.23* | 6.2 (M) |
| 64 | 40/60 | 3 | 38° C., 80% RH | 3.78* | 6.2 (M) |
| 65 | 40/60 | 6 | 38° C., 80% RH | 3.62* | 6.2 (M) |
| 66 | 40/60 | 12 | 38° C., 80% RH | 7.98* | 6.2 (M) |

In Table 13, film properties marked with an "*" satisfy criteria (a), as described in Examples 5 to 8. As shown in Examples 61-66, it unexpectedly has been found that certain water-soluble films containing PVOH resin blends with about 40 wt. % a first PVOH copolymer comprising a first level of anionic monomer incorporation as described herein and about 60 wt. % of a second PVOH copolymer comprising a second level of anionic monomer incorporation as described herein generally meet criteria (a) up to at least 12 weeks of storage at ambient conditions and up to at least 12 weeks of storage at 38° C., 80% RH conditions.

Examples 67-72: Two-Resin Blend Films

Examples 67-72 represent water-soluble films which were formed, each including a blend of the two copolymer Resins A and B. The films each included 40 wt. % Resin A and 60 wt. % Resin B. The blend films included the two resins that made up 100% of the resin in the film, while plasticizers and other non-resin components were present in the amounts and types as described for Example 3. Films were prepared as described for Example 1 and tested as described for Examples 13 to 18. The average DC values are summarized in Table 14. In Table 14, the pendant group (P) content for the film is provided on a molar basis relative to all of the polymeric resin in the film (i.e., including both resins present but excluding the plasticizers and the other non-resin components thereof), and the P values further indicates a maleic anhydride comonomer unit (M).

TABLE 14

Resin and Film Data for Examples 67-72

| Example | Type (Ratio of A/B) | Weeks Stored | Environment Conditions | DC (%) | P (mol. %) |
|---|---|---|---|---|---|
| 67 | 40/60 | 6 | 23° C., 35% RH | 8.62* | 6.2 (M) |
| 68 | 40/60 | 9 | 23° C., 35% RH | 13.10* | 6.2 (M) |
| 69 | 40/60 | 12 | 23° C., 35% RH | 16.68* | 6.2 (M) |
| 70 | 40/60 | 6 | 38° C., 80% RH | 9.46* | 6.2 (M) |
| 71 | 40/60 | 9 | 38° C., 80% RH | 8.08* | 6.2 (M) |
| 72 | 40/60 | 12 | 38° C., 80% RH | 13.55* | 6.2 (M) |

In Table 14, film properties marked with an "*" satisfy criteria (a), as described in Examples 5 to 8. As shown in Examples 67-72, it unexpectedly has been found that certain water-soluble films containing PVOH resin blends with about 40 wt. % a first PVOH copolymer comprising a first level of anionic monomer incorporation as described herein and about 60 wt. % of a second PVOH copolymer comprising a second level of anionic monomer incorporation as described herein generally meet criteria (a) up to at least 12 weeks of storage at ambient conditions and up to at least 12 weeks of storage at 38° C., 80% RH conditions.

Examples 73-78: Two-Resin Blend Films

Examples 73-78 represent water-soluble films which were formed, each including a blend of the two copolymer Resins A and B. The films each included 20 wt. % Resin A and 80 wt. % Resin B. The blend films included the two resins that made up 100% of the resin in the film, while plasticizers and other non-resin components were present in the amounts and types as described for Example 1. Films were prepared as described for Example 1 and tested as described for Examples 13 to 18. The average DC values are summarized in Table 15. In Table 15, the pendant group (P) content for the film is provided on a molar basis relative to all of the polymeric resin in the film (i.e., including both resins present but excluding the plasticizers and the other non-resin components thereof), and the P values further indicates a maleic anhydride comonomer unit (M).

TABLE 15

Resin and Film Data for Examples 73-78

| Example | Type (Ratio of A/B) | Weeks Stored | Environment Conditions | DC (%) | P (mol. %) |
|---|---|---|---|---|---|
| 73 | 20/80 | 3 | 23° C., 35% RH | 12.22* | 7.1 (M) |
| 74 | 20/80 | 6 | 23° C., 35% RH | 20.35* | 7.1 (M) |
| 75 | 20/80 | 12 | 23° C., 35% RH | 9.66* | 7.1 (M) |
| 76 | 20/80 | 3 | 38° C., 80% RH | 12.99* | 7.1 (M) |
| 77 | 20/80 | 6 | 38° C., 80% RH | 6.44* | 7.1 (M) |
| 78 | 20/80 | 12 | 38° C., 80% RH | 4.80* | 7.1 (M) |

In Table 15, film properties marked with an "*" satisfy criteria (a), as described in Examples 5 to 8. As shown in Examples 73-78, it unexpectedly has been found that certain water-soluble films containing PVOH resin blends with about 20 wt. % a first PVOH copolymer comprising a first level of anionic monomer incorporation as described herein and about 80 wt. % of a second PVOH copolymer comprising a second level of anionic monomer as described herein generally meet criteria (a) up to at least 12 weeks of storage at ambient conditions and up to at least 12 weeks of storage at 38° C., 80% RH conditions.

Examples 79-84: Two-Resin Blend Films

Examples 79-84 represent water-soluble films which were formed, each including a blend of the two copolymer Resins A and B. The films each included 20 wt. % Resin A and 80 wt. % Resin B. The blend films included the two resins that made up 100% of the resin in the film, while plasticizers and other non-resin components were present in the amounts and types as described for Example 3. Films were prepared as described for Example 1 and tested as described for Examples 13 to 18. The average DC values are summarized in Table 16. In Table 16, the pendant group (P) content for the film is provided on a molar basis relative to all of the polymeric resin in the film (i.e., including both resins present but excluding the plasticizers and the other non-resin components thereof), and the P values further indicates a maleic anhydride comonomer unit (M).

TABLE 16

Resin and Film Data for Examples 79-84

| Example | Type (Ratio of A/B) | Weeks Stored | Environment Conditions | DC (%) | P (mol. %) |
|---|---|---|---|---|---|
| 79 | 20/80 | 6 | 23° C., 35% RH | 10.76* | 7.1 (M) |
| 80 | 20/80 | 9 | 23° C., 35% RH | 7.83* | 7.1 (M) |
| 81 | 20/80 | 12 | 23° C., 35% RH | 6.58* | 7.1 (M) |
| 82 | 20/80 | 6 | 38° C., 80% RH | 6.12* | 7.1 (M) |
| 83 | 20/80 | 9 | 38° C., 80% RH | 8.25* | 7.1 (M) |
| 84 | 20/80 | 12 | 38° C., 80% RH | 4.25* | 7.1 (M) |

In Table 16, film properties marked with an "*" satisfy criteria (a), as described in Examples 5 to 8. As shown in Examples 79-84, it unexpectedly has been found that certain water-soluble films containing PVOH resin blends with about 20 wt. % a first PVOH copolymer comprising a first level of anionic monomer incorporation as described herein and about 80 wt. % of a second PVOH copolymer comprising a second level of anionic monomer incorporation as described herein meet criteria (a) up to at least 12 weeks of storage at ambient conditions and up to at least 12 weeks of storage at 38° C., 80% RH conditions.

Example 85: Film Swelling

Water-soluble films were formed from single resins or blends of the two copolymer Resins A and B. Films were prepared having weight ratios of Resin A to Resin B of 100/0, 80/20, 60/40, 40/60, 30/70, 20/80, and 0/100. Resin A, B, or the combination of Resin A and Resin B made up 100% of the resin in the films prepared herein, while plasticizers and other non-resin components were present in the amounts and types as described for Example 1. The films were tested for swelling ratio in each of propylene glycol, polyethylene glycol (PEG) 200, glycerin, and diglycerin, in accordance with the Film Swelling Test described herein. The average swelling ratios are summarized in Table 17.

TABLE 17

Average Swelling Ratios of Films in Various Solvents

| Ratio of Resin A/Resin B | Propylene glycol | PEG 200 | Glycerin | Diglycerin |
|---|---|---|---|---|
| 100/0 | 0.1587 | −0.0187 | 0.4040 | 0.0834 |
| 80/20 | 0.2006 | −0.0269 | 0.6630 | 0.1408 |
| 60/40 | 0.2247 | −0.0092 | 0.9705 | 0.1304 |
| 40/60 | 0.4304 | 0.0194 | 1.5743 | 0.1955 |
| 20/80 | 0.6054 | 0.0479 | 6.1284 | 0.3437 |
| 0/100 | 1.7167 | 0.1293 | 10.6665 | 0.7266 |

As shown in Table 17, as the amount of PVOH-maleate copolymer having between 3 and 5 mol % maleate modification (Resin B) increases, the swelling value of the water-soluble film generally increases, and a significant increase is observed for films including no PVOH-maleate copolymer having between 1.5 and 2 mol % maleate modification (Resin A) (e.g., at a ratio of A/B of 0/100). Without intending to be bound by theory, it is believed that when a film demonstrates a swelling ratio value that is no greater than 60% of the swelling ratio value of a comparative film which is identical but for the second PVOH copolymer being the sole resin and the amount of that second PVOH copolymer in the comparative film being equal to the total amount of resins in the inventive water-soluble film (e.g., a ratio of A/B of 0/100), the film is less likely to soften and droop (i.e., remains taut) when formed into pouches enclosing liquid compositions.

Examples 86-92: Single Resin Film Exposed to LLD

Films were prepared with Resin B according to Example 4. Aqueous compositions of the foregoing were cast and dried to form 76 μm thick film samples. The resulting films were exposed to liquid laundry detergent two (LLD 2) as described herein. The films were tested for DC residue values by the above methods prior to storing in contact with the LLD 2 and after storing in contact with the LLD 2 for 3, 6, or 12 weeks at ambient conditions (23° C., 35% RH) or a high stress 38° C., 80% RH environment. The average DC values are summarized in Table 18. In Table 18, the pendant group (P) content for the film is provided on a molar basis relative to the PVOH resins in the film (i.e., excluding the plasticizers and the other non-resin components thereof), and the P value further indicates that the pendant group corresponds to a maleic anhydride comonomer unit (M).

TABLE 18

Resin and Film Data for Examples 86-92

| Example | Type | Weeks Stored | Environment Conditions | DC (%) | P (mol. %) |
|---|---|---|---|---|---|
| 86 | B | 0 | 23° C., 35% RH | 2.28* | 8.00 (M) |
| 87 | B | 3 | 23° C., 35% RH | 1.22* | 8.00 (M) |
| 88 | B | 6 | 23° C., 35% RH | 1.80* | 8.00 (M) |
| 89 | B | 12 | 23° C., 35% RH | 0.81* | 8.00 (M) |
| 90 | B | 3 | 38° C., 80% RH | 2.14* | 8.00 (M) |
| 91 | B | 6 | 38° C., 80% RH | 0.19* | 8.00 (M) |
| 92 | B | 12 | 38° C., 80% RH | 1.77* | 8.00 (M) |

In Table 18, residue values marked with an "*" satisfy the DC residue criteria of 20 wt. % or less. Table 18 demonstrates that water-soluble films comprising a single PVOH resin can have acceptable residue values. In particular, Table 18 demonstrates that a water-soluble film comprising a single PVOH resin comprising a maleic anhydride co-monomer having from about 3 to about 5 mol % of a maleate modification demonstrates good residue values.

Examples 93-99: Single Resin Film Exposed to LLD

Films were prepared with Resin A and non-resin components according to Example 1. Films were formed and tested as described in Examples 86 to 92. The average DC values are summarized in Table 19. In Table 19, the pendant group (P) content for the film is provided on a molar basis relative to the PVOH resins in the film (i.e., excluding the plasticizers and the other non-resin components thereof), and the P value further indicates that the pendant group corresponds to a maleic anhydride comonomer unit (M).

TABLE 19

Resin and Film Data for Examples 93-99

| Example | Type | Weeks Stored | Environment Conditions | DC (%) | P (mol. %) |
| --- | --- | --- | --- | --- | --- |
| 93 | A | 0 | 23° C., 35% RH | 24.05 | 3.50 (M) |
| 94 | A | 3 | 23° C., 35% RH | 22.45 | 3.50 (M) |
| 95 | A | 6 | 23° C., 35% RH | 20.74 | 3.50 (M) |
| 96 | A | 12 | 23° C., 35% RH | 17.48* | 3.50 (M) |
| 97 | A | 3 | 38° C., 80% RH | 23.86 | 3.50 (M) |
| 98 | A | 6 | 38° C., 80% RH | 12.95* | 3.50 (M) |
| 99 | A | 12 | 38° C., 80% RH | 12.30* | 3.50 (M) |

In Table 19, residue values marked with an "*" satisfy DC residue criteria as described in Examples 86 to 92. Table 19 demonstrates that water-soluble films comprising a single PVOH resin can have poor residue values. In particular, Table 19 demonstrates that a water-soluble film comprising a single PVOH resin comprising a maleic anhydride co-monomer having from about 1.5 to about 2 mol % maleate modification can demonstrate poor residue values upon storage in contact with a liquid laundry detergent.

Examples 100-106: Two-Resin Blend Films

Examples 100-106 represent water-soluble films which were formed, each including a blend of the two copolymer Resins A and B. The films each included 80 wt. % Resin A and 20 wt. % Resin B. The blend films included the two resins that made up 100% of the resin in the film, while plasticizers and other non-resin components were present in the amounts and types as described for Example 1. Films were formed and tested as described in Examples 86 to 92. The average DC values are summarized in Table 20. In Table 20, the pendant group (P) content for the film is provided on a molar basis relative to all of the polymeric resin in the film (i.e., including both resins present but excluding the plasticizers and the other non-resin components thereof), and the P values further indicates a maleic anhydride comonomer unit (M).

TABLE 20

Resin and Film Data for Examples 100-106

| Example | Type (Ratio of A/B) | Weeks Stored | Environment Conditions | DC (%) | P (mol. %) |
| --- | --- | --- | --- | --- | --- |
| 100 | 80/20 | 0 | 23° C., 35% RH | 19.68* | 4.4 (M) |
| 101 | 80/20 | 3 | 23° C., 35% RH | 23.41 | 4.4 (M) |
| 102 | 80/20 | 6 | 23° C., 35% RH | 22.42 | 4.4 (M) |
| 103 | 80/20 | 12 | 23° C., 35% RH | 14.08* | 4.4 (M) |
| 104 | 80/20 | 3 | 38° C., 80% RH | 17.54* | 4.4 (M) |
| 105 | 80/20 | 6 | 38° C., 80% RH | 15.18* | 4.4 (M) |
| 106 | 80/20 | 12 | 38° C., 80% RH | 14.18* | 4.4 (M) |

In Table 20, residue values marked with an "*" satisfy the DC residue criteria as described in Examples 86 to 92. As shown in Examples 100-106, it unexpectedly has been found that certain water-soluble films containing PVOH resin blends with about 80 wt. % a first PVOH copolymer comprising a first level of anionic monomer incorporation as described herein and about 20 wt. % of a second PVOH copolymer comprising a second level of anionic monomer incorporation as described herein generally meet the criteria for acceptable residue values and tautness for A/B blend ratios of about 80/20 (w/w, respectively) up to at least 12 weeks of storage at 38° C., 80% RH conditions.

Examples 107-113: Two-Resin Blend Films

Examples 107 to 113 represent water-soluble films which were formed, each including a blend of the two copolymer Resins A and B. The films each included 60 wt. % Resin A and 40 wt. % Resin B. The blend films included the two resins that made up 100% of the resin in the film, while plasticizers and other non-resin components were present in the amounts and types as described for Example 1. Films were formed and tested as described in Examples 86 to 92. The average DC values are summarized in Table 21. In Table 21, the pendant group (P) content for the film is provided on a molar basis relative to all of the polymeric resin in the film (i.e., including both resins present but excluding the plasticizers and the other non-resin components thereof), and the P values further indicates a maleic anhydride comonomer unit (M).

TABLE 21

Resin and Film Data for Examples 107-113

| Example | Type (Ratio of A/B) | Weeks Stored | Environment Conditions | DC (%) | P (mol. %) |
| --- | --- | --- | --- | --- | --- |
| 107 | 60/40 | 0 | 23° C., 35% RH | 11.48* | 5.3 (M) |
| 108 | 60/40 | 3 | 23° C., 35% RH | 23.13 | 5.3 (M) |
| 109 | 60/40 | 6 | 23° C., 35% RH | 14.95* | 5.3 (M) |
| 110 | 60/40 | 12 | 23° C., 35% RH | 23.5 | 5.3 (M) |
| 111 | 60/40 | 3 | 38° C., 80% RH | 16.89* | 5.3 (M) |
| 112 | 60/40 | 6 | 38° C., 80% RH | 15.26* | 5.3 (M) |
| 113 | 60/40 | 12 | 38° C., 80% RH | 14.95* | 5.3 (M) |

In Table 21, residue values marked with an "*" satisfy the DC residue criteria as described in Examples 86 to 92. As shown in Examples 107-113, it unexpectedly has been found that certain water-soluble films containing PVOH resin blends with about 60 wt. % a first PVOH copolymer comprising a first level of anionic monomer incorporation as described herein and about 40 wt. % of a second PVOH copolymer comprising a second level of anionic monomer incorporation as described herein generally meet the criteria for acceptable residue values up to at least 12 weeks of storage at 38° C., 80% RH conditions.

Examples 114-120: Two-Resin Blend Films

Examples 114-120 represent water-soluble films which were formed, each including a blend of the two copolymer Resins A and B. The films each included 40 wt. % Resin A and 60 wt. % Resin B. The blend films included the two resins that made up 100% of the resin in the film, while plasticizers and other non-resin components were present in the amounts and types as described for Example 1. Films were formed and tested as described in Examples 86 to 92. The average DC values are summarized in Table 22. In Table 22, the pendant group (P) content for the film is provided on a molar basis relative to all of the polymeric resin in the film (i.e., including both resins present but excluding the plasticizers and the other non-resin components thereof), and the P value further indicates a maleic anhydride comonomer unit (M).

TABLE 22

Resin and Film Data for Examples 114-120

| Example | Type (Ratio of A/B) | Weeks Stored | Environment Conditions | DC (%) | P (mol. %) |
|---|---|---|---|---|---|
| 114 | 40/60 | 0  | 23° C., 35% RH | 3.76*  | 6.2 (M) |
| 115 | 40/60 | 3  | 23° C., 35% RH | 11.20* | 6.2 (M) |
| 116 | 40/60 | 6  | 23° C., 35% RH | 11.19* | 6.2 (M) |
| 117 | 40/60 | 12 | 23° C., 35% RH | 10.96* | 6.2 (M) |
| 118 | 40/60 | 3  | 38° C., 80% RH | 6.58*  | 6.2 (M) |
| 119 | 40/60 | 6  | 38° C., 80% RH | 9.27*  | 6.2 (M) |
| 120 | 40/60 | 12 | 38° C., 80% RH | 6.33*  | 6.2 (M) |

In Table 22, residue values marked with an "*" satisfy the DC residue criteria as described in Examples 86 to 92. As shown in Examples 114-120, it unexpectedly has been found that certain water-soluble films containing PVOH resin blends with about 40 wt. % a first PVOH copolymer comprising a first level of anionic monomer incorporation as described herein and about 60 wt. % of a second PVOH copolymer comprising a second level of anionic monomer incorporation as described herein generally meet the criteria for acceptable residue values up to at least 12 weeks of storage at ambient conditions and up to at least 12 weeks of storage at 38° C., 80% RH conditions.

Examples 121-127: Two-Resin Blend Films

Examples 121-127 represent water-soluble films which were formed, each including a blend of the two copolymer Resins A and B. The films each included 20 wt. % Resin A and 80 wt. % Resin B. The blend films included the two resins that made up 100% of the resin in the film, while plasticizers and other non-resin components were present in the amounts and types as described for Example 1. Films were formed and tested as described in Examples 86 to 92. The average DC values and tautness values are summarized in Table 23. In Table 23, the pendant group (P) content for the film is provided on a molar basis relative to all of the polymeric resin in the film (i.e., including both resins present but excluding the plasticizers and the other non-resin components thereof), and the P value further indicates a maleic anhydride comonomer unit (M).

TABLE 23

Resin and Film Data for Examples 121-127

| Example | Type (Ratio of A/B) | Weeks Stored | Environment Conditions | DC (%) | P (mol. %) |
|---|---|---|---|---|---|
| 121 | 20/80 | 0  | 23° C., 35% RH | 0.98* | 7.1 (M) |
| 122 | 20/80 | 3  | 23° C., 35% RH | 1.25* | 7.1 (M) |
| 123 | 20/80 | 6  | 23° C., 35% RH | 3.95* | 7.1 (M) |
| 124 | 20/80 | 12 | 23° C., 35% RH | 5.99* | 7.1 (M) |
| 125 | 20/80 | 3  | 38° C., 80% RH | 2.26* | 7.1 (M) |
| 126 | 20/80 | 6  | 38° C., 80% RH | 5.96* | 7.1 (M) |
| 127 | 20/80 | 12 | 38° C., 80% RH | 3.02* | 7.1 (M) |

In Table 23, residue values marked with an "*" satisfy the DC residue value criteria as described in Examples 86 to 92. As shown in Examples 121-127, it unexpectedly has been found that certain water-soluble films containing PVOH resin blends with about 20 wt. % a first PVOH copolymer comprising a first level of anionic monomer incorporation as described herein and about 80 wt. % of a second PVOH copolymer comprising a second level of anionic monomer incorporation as described herein generally meet the criteria for acceptable residue values up to at least 12 weeks of storage at ambient conditions and up to at least 12 weeks of storage at 38° C., 80% RH conditions.

The foregoing description is given for clearness of understanding only, and no unnecessary limitations should be understood therefrom, as modifications within the scope of the invention may be apparent to those having ordinary skill in the art.

All patents, publications and references cited herein are hereby fully incorporated by reference. In case of conflict between the present disclosure and incorporated patents, publications and references, the present disclosure should control.

What is claimed:

1. A water-soluble film comprising:
   a polyvinyl alcohol (PVOH) resin blend comprising:
   a first PVOH copolymer comprising a first anionic monomer unit, the first anionic monomer unit comprising maleic anhydride or an alkali metal salt of maleic anhydride, wherein the first anionic monomer unit is present in the first PVOH copolymer in an amount between about 1 mol % and about 3 mol %; and
   a second PVOH copolymer comprising a second anionic monomer unit, the second anionic monomer unit comprising maleic anhydride or an alkali metal salt of maleic anhydride, wherein the second anionic monomer unit is present in the second PVOH copolymer in an amount between about 3 mol % and 10 mol %;
   wherein the first PVOH copolymer is provided in the blend in an amount in a range of about 10 wt. % to about 70 wt. %, based on the total weight of the PVOH resin blend and the amount of first anionic monomer unit present in the first PVOH copolymer is different from the amount of second anionic monomer unit present in the second PVOH copolymer.

2. The water-soluble film of claim 1, wherein the first PVOH copolymer is present in an amount in a range of about 10 wt. % to about 40 wt. % of total weight of the PVOH resin blend.

3. The water-soluble film of claim 1, wherein the second PVOH copolymer is present in an amount in a range of about 30 wt. % to about 90 wt. % of total PVOH polymer in the film.

4. The water-soluble film of claim 1, wherein the first PVOH copolymer is a maleic anhydride copolymer having a degree of maleic anhydride modification (b1) in an amount of about 1 mol % to about 3 mol %, based on the total moles of monomers in the copolymer, and the second PVOH copolymer is a maleic anhydride copolymer having a second degree of maleic anhydride modification (b2) in an amount of about 3 mol % to about 10 mol %, based on the total moles of monomers in the copolymer, wherein the difference between b1 and b2 is in a range of about 1 mol % to 3 mol %.

5. The water-soluble film of claim 1, wherein the first PVOH copolymer has a 4% aqueous solution viscosity at 20° C. in a range of about 4 cP to about 30 cP.

6. The water-soluble film of claim 1, wherein the second PVOH copolymer has a 4% aqueous solution viscosity at 20° C. in a range of about 12 cP to about 30 cP.

7. The water-soluble film claim 1, wherein the water-soluble film has a residue value of about 20% or less as measured by the Dissolution Chamber Test.

8. The water-soluble film of claim 1, wherein the water-soluble film has a crystallinity of at least 15%.

9. The water soluble film of claim 1, wherein the PVOH resin blend consists essentially of the first PVOH copolymer and the second PVOH copolymer.

10. The water-soluble film of claim 1, wherein the water-soluble film further comprises at least a third water-soluble polymer which is other than a PVOH polymer.

11. The water-soluble film of claim 10, wherein the third water-soluble polymer is selected from one or more of a polyethyleneimine, a polyvinyl pyrrolidone, a polyalkylene oxide, a polyacrylamide, a cellulose ether, a cellulose ester, a cellulose amide, a polyvinyl acetate, a polyamide, a gelatine, a methylcellulose, a carboxymethylcellulose, a carboxymethylcellulose salt, a dextrin, an ethylcellulose, a hydroxyethyl cellulose, a hydroxypropyl methylcellulose, a maltodextrin, a starch, a modified starch, guar gum, gum Acacia, xanthan gum, carrageenan, a polyacrylate, a polyacrylate salt, and a copolymer of any of the foregoing.

12. The water-soluble film of claim 1, wherein the first PVOH copolymer and the second PVOH copolymer each independently have a degree of hydrolysis in a range of about 75% to about 99%.

13. The water-soluble film of claim 1, wherein the water-soluble film further comprises an auxiliary agent selected from one or more of a plasticizer, a plasticizer compatibilizer, a lubricant, a release agent, a filler, an extender, a cross-linking agent, an antiblocking agent, an antioxidant, a detackifying agent, an antifoam, a nanoparticle, a bleaching agent, and a surfactant.

14. The water-soluble film of claim 1, further comprising one or more plasticizers in an amount of 30 phr or greater.

15. The water-soluble film of claim 1, further comprising one or more plasticizers in an amount of less than 30 phr.

16. The water-soluble film of claim 1, comprising a first plasticizer having a molecular weight of 92 g/mol or greater and a second plasticizer having a molecular weight of 150 g/mol or greater.

17. The water-soluble film of claim 16, further comprising a third plasticizer.

18. The water-soluble film of claim 1, further comprising a filler in an amount of at least 2 phr.

19. The water-soluble film of claim 18, wherein the filler comprises a bulking agent, and antiblocking agent, or a combination thereof.

20. An article comprising:
the water-soluble film of claim 1 in the form of a pouch defining an interior pouch volume.

21. The article of claim 20, further comprising a composition contained in the interior pouch volume.

22. The article of claim 21, wherein the composition is a liquid composition.

23. The article of claim 22, wherein the liquid composition is a liquid detergent.

24. The article of claim 22, wherein the liquid composition comprises a low molecular weight polyol.

25. The article of claim 23, wherein the article has a delayed release time of at least 30 seconds as measured by the Liquid Release Test.

* * * * *